(12) United States Patent
Asada et al.

(10) Patent No.: US 7,796,491 B2
(45) Date of Patent: Sep. 14, 2010

(54) WAVELENGTH PLATE, OPTICAL ELEMENT, AND OPTICAL PICKUP

(75) Inventors: Jun-ichi Asada, Kobe (JP); Seiji Nishiwaki, Kobe (JP); Kazuo Momoo, Hirakata (JP)

(73) Assignee: Panasonic Corporation, Osaka (JP)

( * ) Notice: Subject to any disclaimer, the term of this patent is extended or adjusted under 35 U.S.C. 154(b) by 906 days.

(21) Appl. No.: 11/237,197

(22) Filed: Sep. 28, 2005

(65) Prior Publication Data

US 2006/0077858 A1 Apr. 13, 2006

(30) Foreign Application Priority Data

Sep. 29, 2004 (JP) ............................. 2004-283855

(51) Int. Cl.
*G11B 7/135* (2006.01)
(52) U.S. Cl. ................................. 369/112.19
(58) Field of Classification Search ....................... None
See application file for complete search history.

(56) References Cited

U.S. PATENT DOCUMENTS

| | | | | |
|---|---|---|---|---|
| 6,388,977 | B1 * | 5/2002 | Sakai et al. | 369/112.12 |
| 6,643,245 | B2 * | 11/2003 | Yamamoto et al. | 369/112.01 |
| 7,224,661 | B2 * | 5/2007 | Ooto | 369/112.01 |
| 2004/0017761 | A1 * | 1/2004 | Aoyama et al. | 369/112.17 |
| 2004/0174801 | A1 * | 9/2004 | Yamada et al. | 369/125 |
| 2005/0030880 | A1 | 2/2005 | Kitaoka et al. | |
| 2005/0237902 | A1 * | 10/2005 | Nishiwaki et al. | 369/112.12 |

FOREIGN PATENT DOCUMENTS

| | | |
|---|---|---|
| JP | 10-104427 | 4/1998 |
| JP | 10-124906 | 4/1998 |
| JP | 2000-132848 | 5/2000 |
| JP | 2007-276766 | 10/2000 |

OTHER PUBLICATIONS

Pending U.S. Appl. No. 11/112,998, filed Apr. 22, 2005, (corresponds to JP Application No. 2005-12145 cited in [0006], p. 3 of the specification).
Notice of Reasons of Rejection for corresponding Japanese Application No. 2005-278539 dated May 11, 2010 and English translation.

* cited by examiner

*Primary Examiner*—Wayne R Young
*Assistant Examiner*—Aneeta Yodichkas
(74) *Attorney, Agent, or Firm*—Renner, Otto, Boisselle & Sklar, LLP

(57) ABSTRACT

There is provided, in an optical disk apparatus which is capable of recording data to or reading data from a plurality of types of optical disks, a wavelength plate and an optical pickup which can reduce deterioration in signal quality even in the presence of a large birefringence of the substrate of an optical disk. A wavelength plate 6 according to the present invention is a wavelength plate to be placed in an optical path through which rays of a plurality of wavelengths travel back and forth, the plurality of wavelengths including a ray having a wavelength $\lambda$. The wavelength plate includes a two-dimensional array of a plurality of birefringent regions, the birefringent regions including first regions $D_1$ and second regions $D_2$ having different optic axis directions from each other. The relationship $240° \leq \Delta_1 \leq 300°$ is true, where $\Delta_1$ is a retardation of the wavelength plate 6 for the ray of the wavelength $\lambda$.

10 Claims, 20 Drawing Sheets the objective lens 108 by an actuator 136.

WAVELENGTH PLATE, OPTICAL ELEMENT, AND OPTICAL PICKUP

BACKGROUND OF THE INVENTION

1. Field of the Invention

The present invention relates to: a wavelength plate which applies different polarization conversions to light of different wavelengths; and an optical pickup having a laser light source for emitting light of different wavelengths, the optical pickup being used for recording a signal to or reproducing a signal from optical disks of different specifications or standards, e.g., CDs, DVDs, or Blu-ray discs.

2. Description of the Related Art

In recent years, optical disk apparatuses to be used in external storage apparatuses for computers or video recorders or the like might encounter optical disks of various standards (concerning recording density/capacity, groove specifications, substrate thickness, and the like), e.g., CDs (CD-ROM disks, CD-R disks, CDRW disks), DVDs (DVD-ROM disks, DVD-RAM disks, DVD-R disks, DVD-RW disks), or Blu-ray discs. There has been an increase in the number of "multi-disk purpose" apparatuses, each of which can support such a multitude of optical disks by itself.

Such an apparatus includes an optical pickup as an interface with which to write information (data) to or read data from an optical disk. This optical pickup incorporates a plurality of laser light sources of different wavelengths, and photodetectors for generating various signals (an RF signal, focusing and tracking control signals) in response to light reflected from an optical disk. A multi-disk apparatus selects a laser light source and an optical system in accordance with the type of the optical disk which has been loaded, and performs a data write, erase, or read for that optical disk.

Such a multi-disk apparatus is required to support optical disks of various standards and yet have a small size and low costs. To achieve this, it is important to reconcile versatility with respect to different types of optical disks and compactness of the optical system of the optical pickup. Known examples of optical pickups are described in Japanese Laid-Open Patent Publication No. 2000-132848, for example.

In order to attain versatility with respect to different types of optical disks, it is necessary to guarantee a stable signal reproduction performance for optical disks having thick transparent substrates and a large birefringence, for example. On the other hand, in order to keep the optical system compact, it is necessary that the optical elements be shared with respect to light of different wavelengths, thus reducing the number of elements.

Hereinafter, with reference to FIG. 14 and FIGS. 15A to 15C, the structure and operation of an optical pickup which the inventors have disclosed in Japanese Patent Application No. 2005-121245 (hereinafter referred to as the "prior JP application") will be described. Note that this prior JP application is not yet published as of the filing date of the present application.

The optical pickup apparatus shown in FIG. 14 comprises: a light source 101 for generating a plurality of light beams; a collimating lens 104 for collimating a light beam; a polarization element 107, composed of a hologram 105 and a wavelength plate 106; an objective lens 108 for converging a light beam and forming a light spot on a signal surface 109 or 110 of an optical disk; and a photodetector 103 for detecting the intensity of a light beam which has been reflected from the signal surface 109 or 110 of the optical disk. Together with the objective lens 108, the polarization element 107 is attached to a supporting member 135, and thus is integrally driven with the objective lens 108 by an actuator 136.

The photodetector 103 is formed on a semiconductor substrate 102 such as a silicon chip. The substrate 102 has the light source 101 mounted thereon, which is composed of laser chips for emitting two types of laser light, i.e., a length $\lambda_1$ and a wavelength $\lambda_2$. The wavelength $\lambda_1$ is about 650 nm, and the wavelength $\lambda_2$ is about 800 nm. Laser light of the wavelength $\lambda_1$ is used for DVDs, whereas laser light of the wavelength $\lambda_2$ is used for CDs. The photodetector 103 is composed of a plurality of photodiodes for converting light into electrical signals via photoelectric effects. It is assumed that an optical disk having the signal surface 109 is a DVD, whereas an optical disk having the signal surface 110 is a CD. Although FIG. 14 illustrates two optical disks at the same time, one of the optical disks is to be loaded to the apparatus in actuality.

Light of the wavelength $\lambda_1$ which has been radiated from the light source 101 is collimated by the collimating lens 104, and thereafter transmitted through the polarization element 107. The polarization element 107 is an integrated optical element composed of the polarization-type hologram 105 and the wavelength plate 106. The light (wavelength $\lambda_1$) which has been transmitted through the polarization element 107 is converged onto the recording surface 109 of the optical disk (DVD) by the objective lens 108, and reflected therefrom. The reflected light passes back through the objective lens 108 so as to enter the polarization element 107. Due to the polarization dependence of the polarization element 107, the reflected light is diffracted by the polarization element 107.

A portion of the light which has been diffracted by the polarization element 107 passes through the collimating lens 104 so as to enter the photodetector 103. The photodetector 103 generates electrical signals which are in accordance with changes in the light amount (a focusing control signal, a tracking control signal, and an RF signal).

When a CD is loaded instead of a DVD, light of the wavelength $\lambda_2$ is radiated from the light source 101. The light of the wavelength $\lambda_2$ which has been radiated from the light source 101 is also collimated by the collimating lens 104, and transmitted through the polarization element 107. The light transmitted through the polarization element 107 is converged onto the recording surface 110 of the optical disk by the objective lens 108, and reflected at the recording surface 110. The reflected light passes back through the objective lens 108 and is diffracted by the polarization element 107. The diffracted light passes through the collimating lens 104 so as to enter the photodetector 103. The photodetector 103 generates electrical signals which are in accordance with changes in the light amount.

Thus, the above-described optical pickup includes a single light source 101 which radiates light of two different wavelengths, i.e., one for DVDs and another for CDs, as well as the common photodetector 103 which receives light of different wavelengths that is reflected from an optical disk.

In accordance with this structure, there is realized a compact optical pickup which supports optical storage media of different standards. The reason is that there is no need to use any splitting means for splitting light of different wavelengths along the optical path, and that an optical path (forward path) from the light source 101 to the optical storage medium and an optical path (return path) from the optical storage medium to the photodetector 103 can be commonly utilized for light of different wavelengths. As a result, the number of optical elements can be reduced, and the optical pickup can be made small.

FIG. 15A shows a plan view of the wavelength plate 106 according to the prior JP application as illustrated in FIG. 14.

FIG. 15B is a diagram illustrating how the light traveling from the light source toward the optical disk 110 and the reflected light from the optical disk 110 are led forth and back through the wavelength plate 106. FIG. 15C is a diagram illustrating exemplary polarization conversion.

FIG. 15A shows the planar structure of the wavelength plate 106. The wavelength plate 106 is divided into four regions by lines (x axis, y axis) extending through the optical axis center. The four regions are: two regions A each having an optic axis which constitutes an angle of $\theta_1$ with respect to the x axis direction; and two regions B each having an optic axis which constitutes an angle of $\theta_2$ with respect to the x axis direction. Thus, the wavelength plate 106 has a plurality of birefringent regions whose optic axes extend in different directions, such that regions having the same property are present at 180° rotation symmetrical positions with respect to the optical axis extending through the origin of x-y coordinates.

It is assumed that, when light (linearly polarized light) which is radiated from the light source enters the wavelength plate 106, the polarization direction (i.e., the direction in which the electric field vector vibrates) of the light is parallel to the x axis. The angles $\theta_1$ and $\theta_2$ are, for example, 45°−α and 45°+α (where 0<α≦15°) with respect to the x axis direction, respectively. Any wavelength plate having a distribution of such regions of different properties will hereinafter be referred to as a "distributed-type wavelength plate".

Among the rays which are radiated from the light source and enter the wavelength plate 106, those rays which pass through a region A are converged onto the optical disk 110 by the lens 108, and reflected from the optical disk 110. After being transmitted back through the lens 108, the reflected light will pass through the other region A, which is at a symmetric position with respect to the optical axis. Similarly, those rays which pass through a region B will travel through the other region B after being reflected from the optical disk 110.

Assuming that the wavelength plate 106 has a refractive index anisotropy of Δn and a thickness of d, and that the wavelength of laser light for DVDs is $\lambda_1$, a retardation of the wavelength plate 106 (which is expressed as 360°×Δnd/λ) is prescribed to be 90°. If the value of α (which defines the direction of the optic axis) is zero, then the wavelength plate 106 functions as a conventional ¼ wavelength plate. If linearly polarized light (P-polarized light) having an electric field vector which is parallel to the x axis direction enters the ¼ wavelength plate, the light is converted into circularly polarized light, and is emitted from the wavelength plate. After being reflected from the optical information medium, the circularly polarized light travels through the wavelength plate, whereby it is converted into linearly polarized light (S-polarized light component) having an electric field vector which is parallel to the y axis direction.

Since α is not zero in the wavelength plate 106 shown in FIG. 15A, different polarization conversions are applied to light which is transmitted back and forth through the regions A and to the light which is transmitted back and forth through the regions B. However, since α is small (0<α≦15°), there is a smaller difference in polarization state than in the case where light is transmitted back and forth through a conventional ¼ wavelength plate. Therefore, the return path light having the wavelength $\lambda_1$ enters the hologram 105 in a polarization state similar to the polarization state in the case where the light is transmitted through a ¼ wavelength plate having a substantially uniform optic axis direction.

On the other hand, with respect to laser light for CDs (wavelength $\lambda_2$), the retardation of the wavelength plate 106 (which is generally in inverse proportion with the wavelength) is about 75° (=90°×650/800≈90°×5/6). Therefore, when P-polarized light enters the wavelength plate 106, the light becomes elliptically polarized light, and is emitted from the wavelength plate as such. When the light reflected from the optical information medium 110 travels back through the wavelength plate 106, the light is converted into elliptically polarized light, with the direction of the major axis of the ellipse being changed. The major axis of the ellipse is substantially parallel to the y axis direction, so that there is a higher proportion of the S-polarized light component. The polarization state of laser light for CDs having the wavelength $\lambda_2$ changes depending on whether it is transmitted through the regions A or the regions B, and the difference therebetween is greater than that for light of the wavelength $\lambda_1$.

FIG. 15C shows changes in the polarization state of laser light for CDs (wavelength $\lambda_2$). As described above, when linearly polarized light I having an electric field vector which is parallel to the x axis direction is transmitted through the wavelength plate 106, the light is subjected to different polarization conversions depending on whether the light is transmitted through a region A or a region B. The linearly polarized light I is converted to elliptically polarized light II by the wavelength plate 106. If the optical disk 110 has no birefringence, light which is reflected from the optical disk 110 and travels back through the wavelength plate 106 is converted into elliptically polarized light III, the major axis of whose ellipse is in a direction as shown in FIG. 15C.

1 On the other hand, in the case where the optical disk 110 has birefringence, as shown in FIG. 15C for example, the light which is transmitted through the regions A is converted into light III', which has the same polarization state as that of the linearly polarized light I. The light III' is not diffracted by the polarization hologram 105 of FIG. 14, but returns to the light source 101. As a result, the photodetector 103 cannot detect the light III'.

On the other hand, light which is transmitted through the regions B is subjected to a different polarization conversion from that which is applied to the light transmitted through the regions A. As shown in FIG. 15C, even if the optical disk 110 has birefringence, the light III' becomes elliptically polarized light having an S-polarized component, and therefore is diffracted by the polarization hologram 105 of FIG. 14.

Thus, with the wavelength plate 106 as shown in FIG. 15A, regardless of the amount of birefringence of the optical disk 110, there will exist a component of light which is transmitted through at least either the regions A or the regions B and diffracted by the polarization hologram. Therefore, there will always be some diffracted light entering the photodetector 103.

Even in the case where the optical disk has no birefringence, the signal light amount ascribable to light of the wavelength $\lambda_2$ is smaller than the signal light amount ascribable to light of the wavelength $\lambda_1$. This is because light of the wavelength $\lambda_2$ does not satisfy the perfect diffraction condition in its return path. Although a CD has a thick substrate and therefore is likely to acquire a large birefringence during the fabrication process, it is relatively easy to produce high power laser light for CDs; therefore, rather than trying to efficiently direct reflected light into the photodetector, it would be more preferable to employ a distributed-type wavelength plate for securement of signal light. On the other hand, a DVD has a thin substrate thickness and therefore its substrate is unlikely to acquire birefringence during the fabrication process; however, laser light for DVDs tends to have a short wavelength and low power, and therefore reflected light must be directed into the photodetector with a high efficiency.

Among the optical disks that are actually on the market which have thick substrates, e.g., CDs, some may have extreme birefringence fluctuations. In worst cases, the substrate of an optical disk may function as a ½ wavelength plate. In such cases, light which passes through the wavelength plate and enters the polarization hologram will not be diffracted by the polarization hologram. In the case where the substrate of an optical disk has such an extremely large birefringence, the problematic decrease in the signal light amount will not be adequately overcome even by employing the wavelength plate 106 as shown in FIG. 15A.

FIG. 16 is a graph illustrating the relationship between degrees of birefringence (phase difference) of an optical disk and signal characteristics, where the aforementioned wavelength plate 106 is employed. In FIG. 16, (a) relates to CDs, whereas (b) relates to DVDs. The retardation of the wavelength plate 106 used is 90° with respect to laser wavelength for DVDs, and 75° with respect to the laser light wavelength for CDs. The optic axis directions of the regions A and the regions B are 45°±10°, respectively, with respect to the x axis. The horizontal axis of the graph represents the phase difference which is imparted to the light traveling back and forth through the optical disk substrate, whereas the vertical axis represents the jitter value (Jitter), DC level, and AC amplitude of the reproduction signal.

FIG. 17 is a graph illustrating the relationship between degrees of birefringence (phase difference) of an optical disk and signal characteristics, where a conventional wavelength plate having a uniform optic axis direction is employed. In FIG. 17, (a) relates to CDs, whereas (b) relates to DVDs. The retardation of the wavelength plate 106 used is 90° with respect to laser wavelength for DVDs, and 75° with respect to the laser light wavelength for CDs. The optic axis direction of the wavelength plate is 45° with respect to the x axis. The horizontal axis of the graph represents the phase difference which is imparted to the light traveling back and forth through the optical disk substrate, whereas the vertical axis represents the jitter value (Jitter), DC level, and AC amplitude of the reproduction signal (RF signal).

In the case where a conventional uniform wavelength plate is employed, as seen from FIG. 17, the DC level and AC amplitude of the reproduction signal become zero when the optical disk has a 90° birefringence. On the other hand, in the case where a distributed-type wavelength plate is employed, as seen from FIG. 16, neither the DC level nor the AC amplitude of the reproduction signal would become zero. However, its signal level is reduced to ⅒ or less of the signal level in the case where there is a 0° birefringence, thus indicating an extremely low signal-to-noise ratio (S/N), with an outstanding decrease in AC amplitude. This is presumably because the spatial frequency characteristics are deteriorated due to non-uniformity within the cross section of rays which are diffracted by the hologram in the return path.

In the case where a uniform wavelength plate is employed, the jitter value becomes infinite when the birefringence is 75° or more, as can be seen from FIG. 17. In the case where a distributed-type wavelength plate is employed, as seen from FIG. 16, the jitter value does not become infinite even when the birefringence is 90°, but is still as large as about 15%, thus indicating a serious deterioration in the reproduction signal.

Although the same is also true of laser light for DVDs, since a DVD has a thin substrate, the amount of birefringence which would occur during the fabrication process is ±60° or less. Therefore, the jitter aggravation is within a tolerable range.

Thus, even by employing a distributed-type wavelength plate as shown in FIG. 15A, only a reproduction signal with a deteriorated quality can be obtained from an optical disk which has an extremely large amount of birefringence. One way to solve the problem of degradation of the signal light might be to employ circuitry for amplifying the signal. However, since the birefringence of the optical disk greatly varies between e.g. the inner periphery and the outer periphery of a single optical disk, frequent switching of the signal amplification gain would be required for a single optical disk, which is not practical.

It might seem effective to increase the separation angle a between the optic axis directions of the respective regions of the distributed-type wavelength plate, in order to increase the amount of light which enters the detector when the amount of birefringence is 90°. However, increasing the separation angle α would result in an interference between the rays transmitted through the respective regions of the wavelength plate, and hence deterioration in signal quality.

Moreover, the number of divided regions having different optic axes is preferably greater than the number illustrated in FIG. 15A. By increasing the number of divided regions, signal characteristics with lower jitter values are realized. The reason why the jitter value increases as the birefringence of the disk substrate increases as shown by the graph of (a) of FIG. 16 is that the deviations in optical intensity across the ray cross section of the return path light increase as the birefringence increases, thus resulting in a poor convergence quality of the light spot that is converged on the detection surface.

SUMMARY OF THE INVENTION

In order to overcome the problems described above, preferred embodiments of the present invention provide, in an optical disk apparatus which is capable of recording data to or reading data from a plurality of types of optical disks, a wavelength plate and an optical pickup which can reduce deterioration in signal quality even in the presence of a large birefringence of the substrate of an optical disk.

A wavelength plate according to the present invention is a wavelength plate to be placed in an optical path through which rays of a plurality of wavelengths travel back and forth, the plurality of wavelengths including a ray having a wavelength λ, the wavelength plate comprising: a two-dimensional array of a plurality of birefringent regions, the birefringent regions including first and second regions having different optic axis directions from each other, wherein the relationship $240° \leq \Delta_1 \leq 300°$ is true, where $\Delta_1$ is a retardation of the wavelength plate for the ray of the wavelength λ.

Alternatively, a wavelength plate according to the present invention is a wavelength plate to be placed in an optical path through which rays of a plurality-of wavelengths travel back and forth, the plurality of wavelengths including a ray having a wavelength λ, the wavelength plate comprising: first and second phase shift layers stacked together, wherein, the first phase shift layer includes a two-dimensional array of a plurality of birefringent regions, the birefringent regions including first and second regions having different optic axis directions from each other, such that the relationship $150° \leq \Delta_1 < 210°$ is true, where $\Delta_1$ is a retardation for the ray of the wavelength λ; and the second phase shift layer has a uniform optic axis direction, such that the relationship $\{(2n-1) \times 90°\} - 30° \leq \Delta_2 \leq \{(2n-1) \times 90°\} + 30°$ is satisfied (where n is an integer), where $\Delta_2$ is a retardation for the ray of the wavelength λ.

Alternatively, a wavelength plate according to the present invention is a wavelength plate to be placed in an optical path through which rays of a plurality of wavelengths travel back and forth, the plurality of wavelengths including a ray having a wavelength λ, the wavelength plate comprising: first and second phase shift layers stacked together, wherein, the first phase shift layer includes a two-dimensional array of a plurality of birefringent regions, the birefringent regions including first and second regions having different optic axis directions from each other, such that the relationship $105° \leq \Delta_1 \leq 165°$ is true, where $\Delta_1$ is a retardation for the ray of the wavelength λ; and the second phase shift layer has a uniform optic axis direction, such that the relationship $\{(2m-1) \times 90°\} + 45° - 30° \leq \Delta_2 \leq \{(2m-1) \times 90°\} + 45° + 30°$ is satisfied (where m is an integer), where $\Delta_2$ is a retardation for the ray of the wavelength λ.

Alternatively, a wavelength plate according to the present invention is a wavelength plate to be placed in an optical path through which rays of a plurality of wavelengths travel back and forth, the plurality of wavelengths including a ray having a wavelength λ, the wavelength plate comprising: first and second phase shift layers stacked together, wherein, the first phase shift layer includes a two-dimensional array of a plurality of birefringent regions, the birefringent regions including first and second regions having different optic axis directions from each other; the second phase shift layer has a uniform optic axis direction; and the relationship $240° \leq \Delta_1 \leq 300°$ is true, where $\Delta_1$ is a retardation of the wavelength plate for the ray of the wavelength λ.

In a preferred embodiment, the plurality of birefringent regions are disposed so as to be axisymmetrical with respect to each of two lines intersecting each other on a surface of the wavelength plate, the two lines intersecting at a center axis which is perpendicular to the surface, and rotation symmetrical with respect to the center axis.

In a preferred embodiment, the plurality of birefringent regions are disposed so that the first regions and the second regions form a check pattern.

In a preferred embodiment, the optic axis direction of the first regions is $45° - \alpha$ (where $0 < \alpha \leq 15°$) with respect to a polarization direction of the ray of the wavelength λ, and the optic axis direction of the second regions is $45° + \alpha$ (where $0 < \alpha \leq 15°$) with respect to the polarization direction of the ray having the wavelength λ.

In a preferred embodiment, the optic axis direction of the first regions is $45° + \delta - \alpha$ (where $0 < \alpha \leq 15°$) with respect to a polarization direction of the ray of the wavelength λ, and the optic axis direction of the second regions is $45° + \delta + \alpha$ (where $0 < \alpha \leq 15°$) with respect to the polarization direction of the ray having the wavelength λ.

In a preferred embodiment, the plurality of birefringent regions include a third region having an optic axis direction which is different from the optic axis directions of the first and second regions; and the optic axis direction of the third region is 45° with respect to a polarization direction of the ray of the wavelength λ.

Alternatively, a wavelength plate according to the present invention is a wavelength plate to be placed in an optical path through which rays of a plurality of wavelengths travel back and forth, the plurality of wavelengths including a ray having a wavelength λ, the wavelength plate comprising: a two-dimensional array of a plurality of birefringent regions, the birefringent regions including first and second regions having different retardations from each other, wherein the retardation of the first regions for the ray of the wavelength λ is $270° + \delta 1$ (where $0° < \delta 1 \leq 30°$), and the retardation of the second region for the ray of the wavelength λ is $270° - \delta 2$ (where $0° < \delta 2 \leq 30°$).

In a preferred embodiment, the plurality of birefringent regions include regions having different optic axis directions from each other.

In a preferred embodiment, with respect to a polarization direction of the ray of the wavelength λ, the optic axis direction of each of the plurality of birefringent regions is either one of: $45° \pm \alpha$ (where $0 < \alpha \leq 15°$); $45° + \delta \pm \alpha$ (where $-10° \leq \delta \leq 10°$, $0 < \alpha \leq 15°$); or 45°.

In a preferred embodiment, the plurality of birefringent regions are disposed so as to be axisymmetrical with respect to each of two lines intersecting each other on a surface of the wavelength plate, the two lines intersecting at a center axis which is perpendicular to the surface, and rotation symmetrical with respect to the center axis.

In a preferred embodiment, the plurality of birefringent regions are disposed so that the first regions and the second regions form a check pattern.

An optical element according to the present invention comprises: the wavelength plate of claim 1; and a polarization filter.

In a preferred embodiment, the polarization filter is a polarization hologram.

An optical pickup according to the present invention comprises: at least one light source for radiating rays of a plurality of wavelengths, including a ray having a wavelength λ; converging means for converging a ray radiated from the light source onto an optical information medium; a photodetector for receiving light reflected from the optical information medium; and an optical element disposed in a portion commonly shared by an optical path of a ray traveling from the light source toward the optical information medium and an optical path of a ray traveling from the optical information medium toward the photodetector, wherein, the optical pickup includes a wavelength plate and a polarization filter, the wavelength plate comprising: a two-dimensional array of a plurality of birefringent regions, the birefringent regions including first and second regions having different optic axis directions from each other, wherein the relationship $240° \leq \Delta_1 \leq 300°$ is true, where $\Delta_1$ is a retardation of the wavelength plate for the ray of the wavelength λ.

In a preferred embodiment, the photodetector receives any one of the rays of the plurality of wavelengths reflected from the optical information medium.

Alternatively, an optical pickup according to the present invention comprises: a unit integrating: at least one light source for radiating rays of a plurality of wavelengths, including a ray having a wavelength λ, and a photodetector for receiving any one of the rays of the plurality of wavelengths reflected from an optical information medium; and an optical element disposed in a portion commonly shared by an optical path of a ray traveling from the light source toward the optical information medium and an optical path of a ray traveling from the optical information medium toward the photodetector, wherein, the optical pickup includes a wavelength plate and a polarization filter, the wavelength plate comprising: a two-dimensional array of a plurality of birefringent regions, the birefringent regions including first and second regions having different optic axis directions from each other, wherein the relationship $240° \leq \Delta_1 \leq 300°$ is true, where $\Delta_1$ is a retardation of the wavelength plate for the ray of the wavelength λ.

Alternatively, an optical pickup according to the present invention comprises: at least one light source for radiating rays of a plurality of wavelengths, including a ray having a wavelength λ; converging means for converging a ray radiated from the light source onto an optical information medium; a photodetector for receiving light reflected from the optical information medium; and an optical element disposed in a portion commonly shared by an optical path of a ray traveling from the light source toward the optical information medium and an optical path of a ray traveling from the optical information medium toward the photodetector, wherein, the optical pickup includes a wavelength plate and a polarization filter, the wavelength plate comprising: a two-dimensional array of a plurality of birefringent regions, the birefringent regions including first and second regions having different retardations from each other, wherein the retardation of the first regions for the ray of the wavelength λ is 270°+δ1 (where 0°<δ1≦30°), and the retardation of the second region for the ray of the wavelength λ is 270°−δ2 (where 0°<δ2≦30°).

According to the present invention, in an optical pickup which performs recording/reproduction for optical information media of different substrate thicknesses or recording densities by using light of different wavelengths, loss of light amount can be prevented for one of the wavelengths, while the influence of substrate birefringence is greatly reduced with respect to the other wavelength. Thus, there is realized an optical pickup which attains high efficiency and excellent performance with a simple structure.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
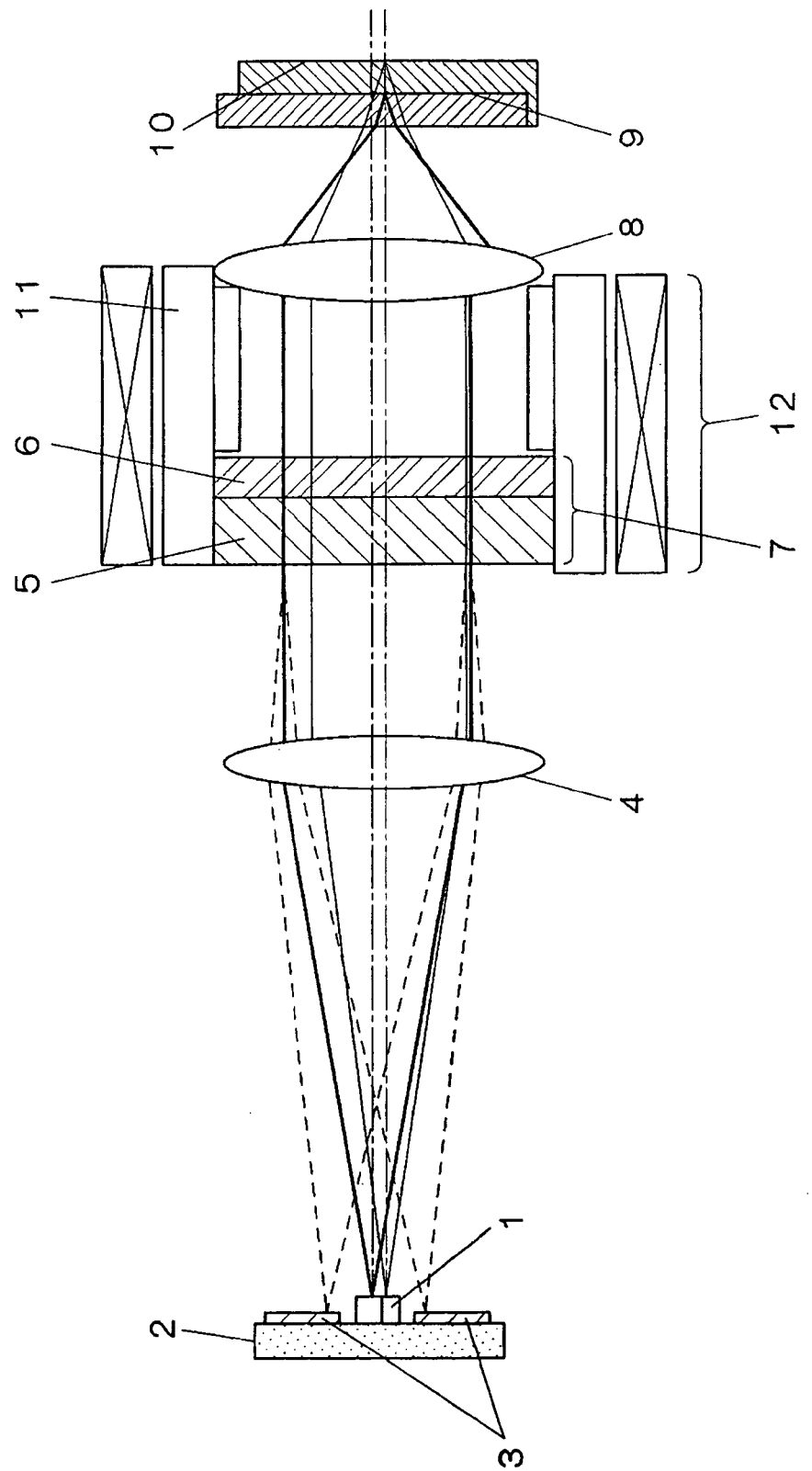
FIG. 1 is a diagram showing the structure of an optical pickup according to Embodiment 1 of the present invention.

Hereinafter, preferred embodiments of the present invention will be described with reference to the accompanying drawings.

Embodiment 1

First, with reference to FIG. 1 and FIGS. 2A to 2C, a first embodiment of a wavelength plate and an optical pickup according to the present invention will be described. Note that like constituent elements will be denoted by like reference numerals in the following descriptions.

An optical pickup apparatus shown in FIG. 1 comprises: a light source 1 for generating a plurality of light beams; a collimating lens 4 for collimating a light beam; a polarization element 7, composed of a hologram 5 and a wavelength plate 6; an objective lens 8 for converging a light beam and forming a light spot on a signal surface 9 or 10 of an optical disk; and a photodetector 3 for detecting the intensity of a light beam which has been reflected from the signal surface 9 or 10 of the optical disk. Together with the objective lens 8, the polarization element 7 is attached to a supporting member 11, and thus is integrally driven with the objective lens 8 by an actuator 12.

The light source 1 may be a single light-emitting device as shown in FIG. 1, or a set of light-emitting devices for respectively radiating laser light of different wavelengths. The polarization element 7 is disposed in a portion commonly shared by an optical path (forward path) of light from the light source 1 to the objective lens 8 and an optical path (return path) of light reflected from the signal surface 9 or 10 of the optical disk back to the photodetector 3.

The photodetector 3 is formed on a semiconductor substrate 2 such as a silicon chip. The substrate 2 has the light source 1 mounted thereon, which is composed of laser chips for emitting two types of laser light, i.e., a wavelength $\lambda_1$ and a wavelength $\lambda_2$. The wavelength $\lambda_1$ is about 650 nm, and the wavelength $\lambda_2$ is about 800 nm. Laser light of the wavelength $\lambda_1$ is used for DVDs, whereas laser light of the wavelength $\lambda_2$ is used for CDs.

The photodetector 3 is composed of a plurality of photodiodes for converting light into electrical signals via photoelectric effects. It is assumed that an optical disk having the signal surface 9 is a DVD, whereas an optical disk having the signal surface 10 is a CD. Although FIG. 1 illustrates two optical disks at the same time, one of the optical disks is to be loaded to the apparatus in actuality.

Light of the wavelength $\lambda_1$ which has been radiated from the light source 1 is collimated by the collimating lens 4, and thereafter transmitted through the polarization element 7. The polarization element 7 is an integrated optical element composed of the polarization-type hologram 5 and the wavelength plate 6. The light (wavelength $\lambda_1$) which has been transmitted through the polarization element 7 is converged onto the recording surface 9 of the optical disk (DVD) by the objective lens 8, and reflected therefrom. The reflected light passes back through the objective lens 8 so as to enter the polarization element 7. Due to the polarization dependence of the polarization element 7, the reflected light is diffracted by the polarization element 7. A portion of the light which has been diffracted by the polarization element 7 passes through the collimating lens 4 so as to enter the photodetector 3. The photodetector 3 generates electrical signals which are in accordance with changes in the light amount (a focusing control signal, a tracking control signal, and an RF signal).

When a CD is loaded instead of a DVD, light of the wavelength $\lambda_2$ is radiated from the light source 1. The light of the wavelength $\lambda_2$ which has been radiated from the light source 1 is also collimated by the collimating lens 4, and transmitted through the polarization element 7. The light transmitted through the polarization element 7 is converged onto the recording surface 10 of the optical disk by the objective lens 8, and reflected at the recording surface 10. The reflected light passes back through the objective lens 8 and is diffracted by the polarization element 7. The diffracted light passes through the collimating lens 4 so as to enter the photodetector 3. The photodetector 3 generates electrical signals which are in accordance with changes in the light amount.

Thus, the above-described optical pickup includes a single light source 1 which radiates light of two different wavelengths, i.e., one for DVDs and another for CDs, as well as the common photodetector 3 which receives light of different wavelengths that is reflected from an optical disk. Although the present embodiment illustrates an example where the light source 1 and the detector 3 are integrated into one unit, these may be separate elements. Although the wavelength plate 6 is illustrated as being integrated with the polarization hologram 5, these may be separate elements. Instead of the polarization hologram 5, a polarization filter, e.g., PBS, may be used.

Figure 14:
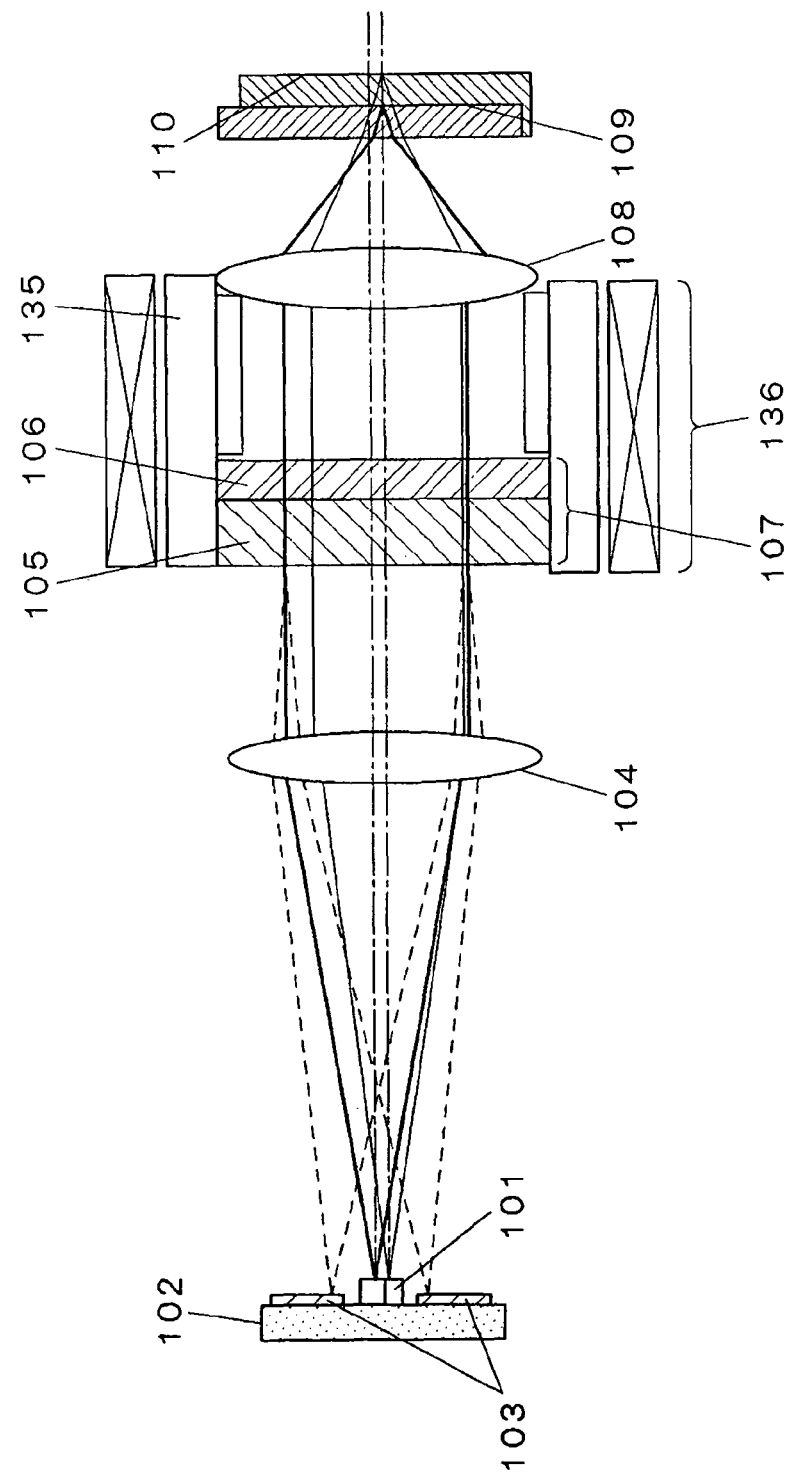
FIG. 14 is a diagram showing the structure of an optical pickup which is disclosed in Japanese Patent Application No. 2005-121245 ("prior JP application").
Figure 15A:
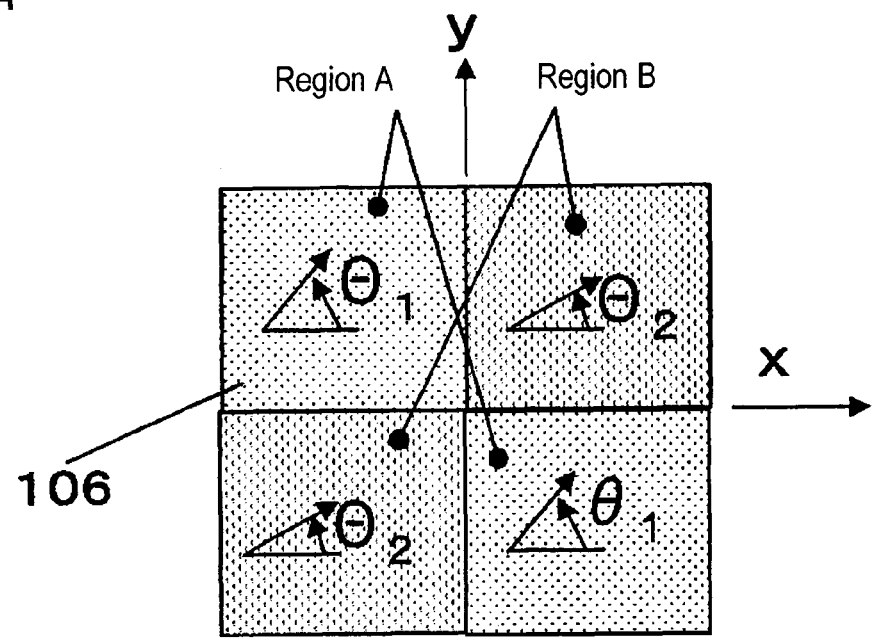
FIG. 15A is a plan view of a wavelength plate 106 used in the optical pickup of FIG. 14.
Figure 15B:
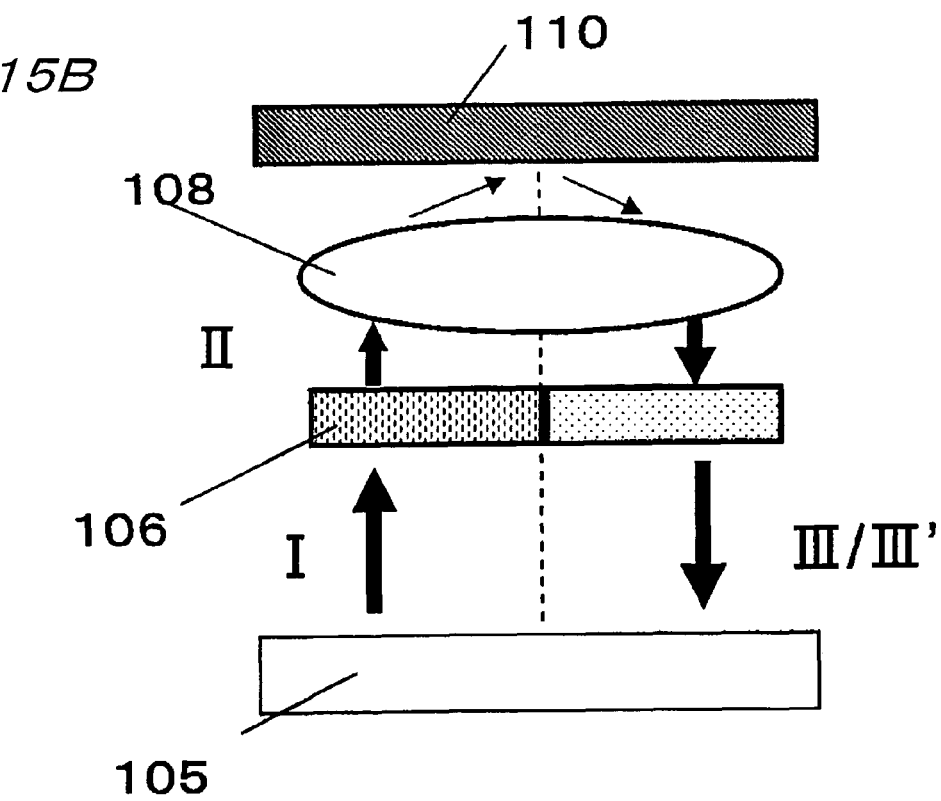
FIG. 15B is a partial cross-sectional view of the optical pickup of FIG. 14.
Figure 15C:
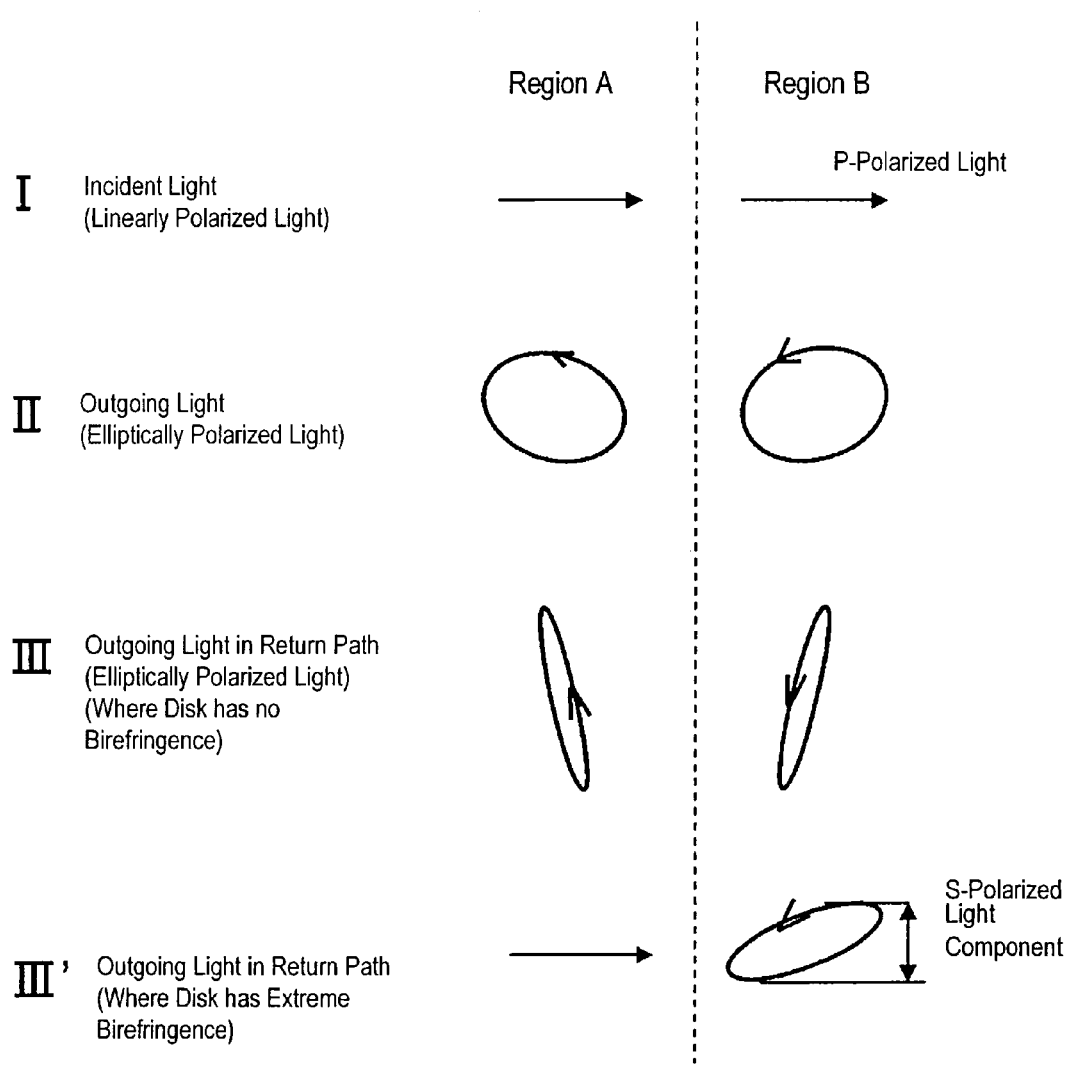
FIG. 15C is a chart showing manners in which polarization states are changed in the optical pickup of FIG. 14.

A major difference between the optical pickup of the present embodiment and the optical pickup of FIG. 14 lies in the structure of the wavelength plate 6.

Figure 2A:
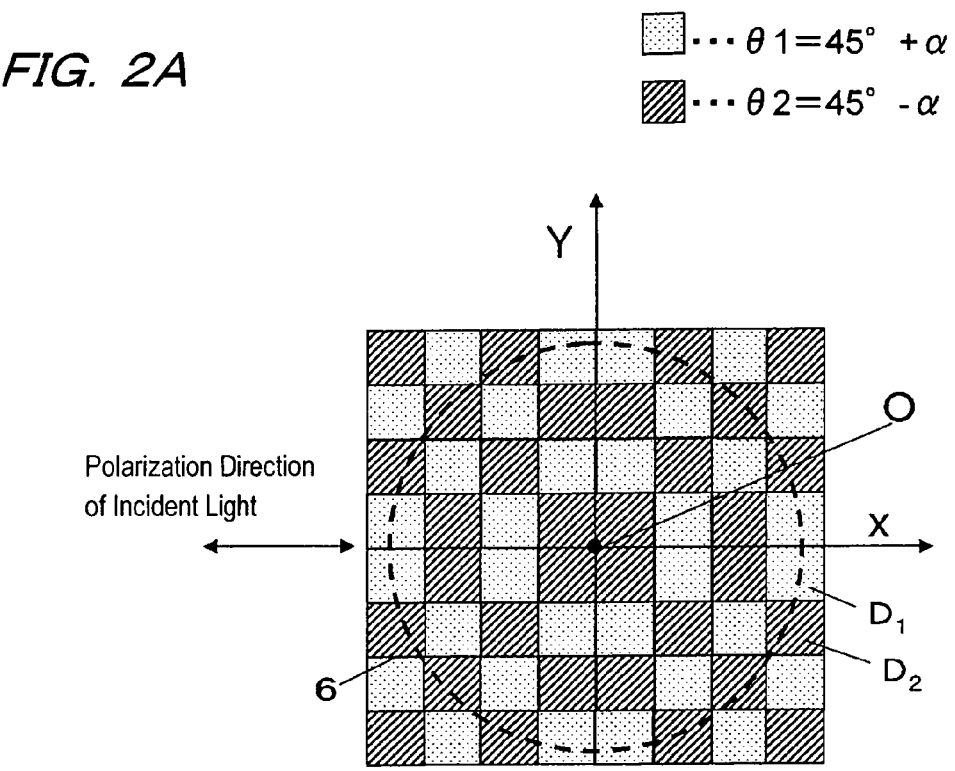
FIG. 2A is a plan view showing a wavelength plate according to Embodiment 1.
Figure 2B:
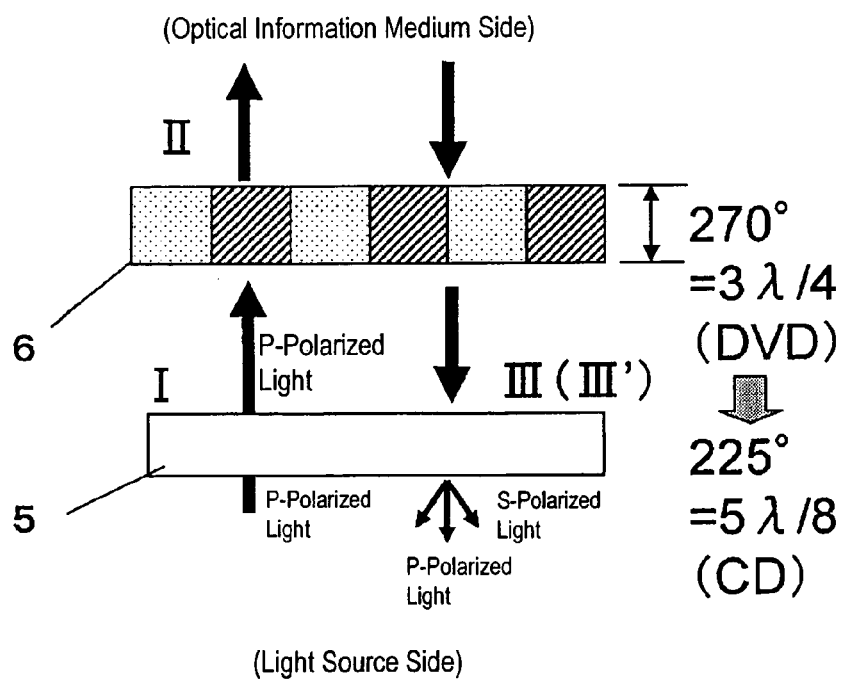
FIG. 2B is a partial side view showing an optical pickup including the wavelength plate according to Embodiment 1.
Figure 2C:
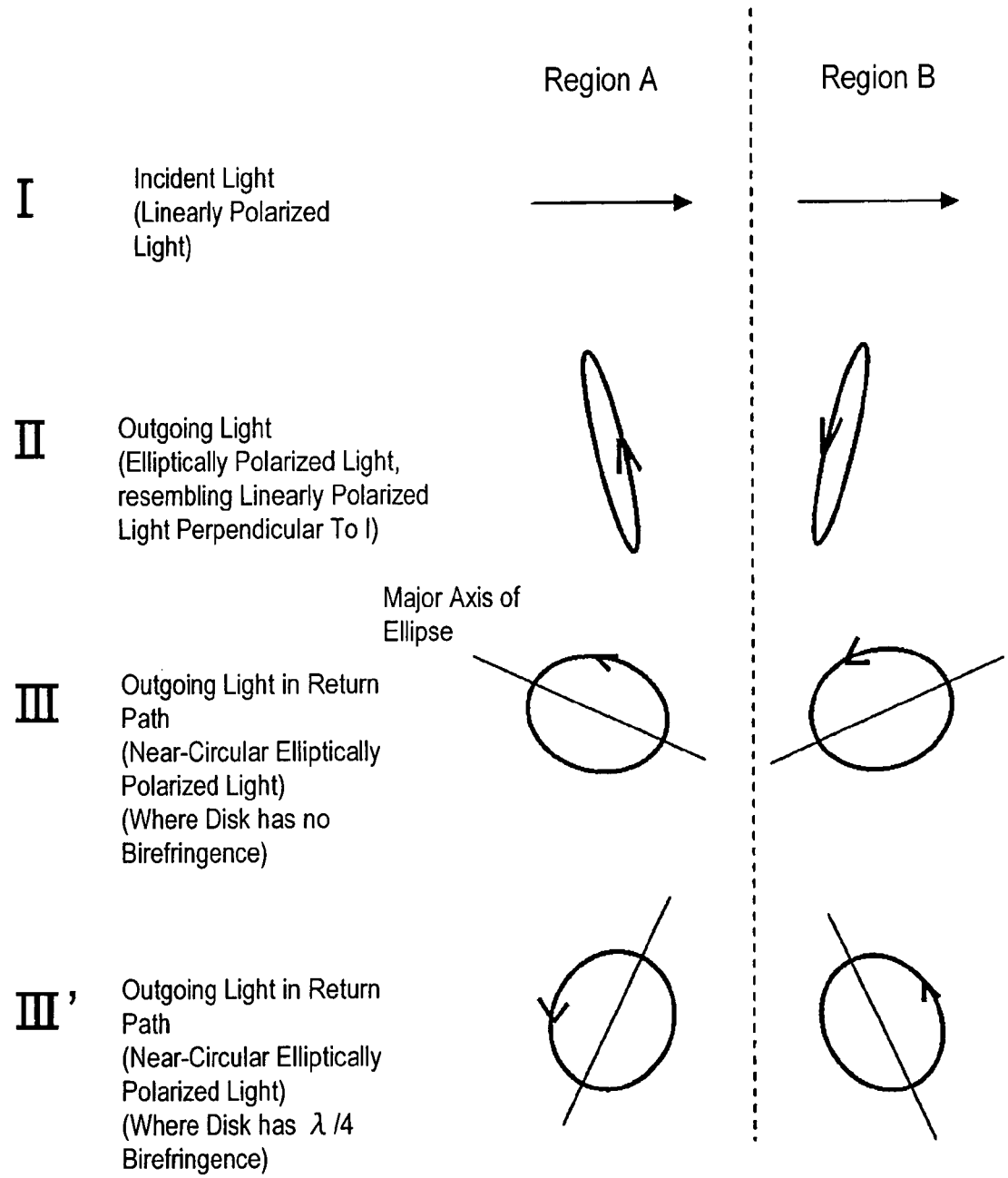
FIG. 2C is a chart showing manners in which polarization states are changed by the wavelength plate according to Embodiment 1.

Hereinafter, with reference to FIGS. 2A to 2C, the structure and function of the wavelength plate 6 will be described. FIG. 2A is a plan view of the wavelength plate 6 shown in FIG. 1. FIG. 2B is a side view of the wavelength plate 6 and the polarization hologram 5. FIG. 2C is a chart illustrating exemplary changes in the polarization state.

As shown in FIG. 2A, the wavelength plate 6 includes regions arranged in a check pattern, in which regions having the same optic axis direction are present in symmetric positions, both with respect to an optical axis center O and lines (x axis, y axis) extending through the optical axis center. More specifically, each dot region $D_1$ has an optic axis direction which is at $\theta_1$ with respect to the x axis, and each hatched region $D_2$ has an optic axis direction which is at $\theta_2$ with respect to the x axis. The direction of the x or y axis respectively coincides with a radial direction or a track tangential direction of the optical disk. The center point at which the x axis and the y axis intersect each other coincides with the center of the objective lens. The polarization direction of linearly polarized light (P-polarized light) which enters the wavelength plate 6 from the light source side coincides with the x axis. The angles $\theta_1$ and $\theta_2$ are $45°+\alpha$ and $45°-\alpha$ (where $0<\alpha\leq15°$) with respect to the x axis direction, respectively.

In the present embodiment, for light of the wavelength $\lambda_1$, the phase difference (retardation) between the ordinary light and the extraordinary light which are transmitted through the wavelength plate 6 is 270°. Therefore, the wavelength plate 6 functions as a ¾ wavelength plate for light of the wavelength $\lambda_1$. The retardation of a wavelength plate is in inverse proportion with the wavelength when there is little wavelength dispersion. Therefore, the wavelength plate 6 has a retardation of about 225° (=270°×650/800) for light of the wavelength $\lambda_2$. Therefore, the wavelength plate 6 functions as a ⅝ plate for light of the wavelength $\lambda_2$.

As shown in FIG. 2B, light I which enters the wavelength plate 6 from the light source side is converted into light II, whose polarization state has been changed, by being transmitted through the wavelength plate 6. The light II is reflected from an optical information medium (not shown in FIG. 2B), and thereafter is transmitted back through the wavelength plate 6, thereby being converted into light III which enters the polarization hologram 5. In the present embodiment, among the rays which are radiated from the light source and enter the wavelength plate 6, those rays which pass through a region $D_1$ are converged onto the optical disk 10 by the lens 8, and reflected from the optical disk 10. After being transmitted back through the lens 8, the reflected light will pass through a region $D_1$ which is at a symmetric position from the aforementioned region $D_1$ with respect to the optical axis. Similarly, those rays which pass through a region $D_2$ will travel through a corresponding region $D_2$ in a symmetric position after being reflected from the optical disk 10.

Since light travels back and forth through the wavelength plate 6, the wavelength plate 6 functions as a 5/4 wavelength plate (i.e., ¼ wavelength plate) for light of the wavelength $\lambda_2$. If the substrate of the optical disk has no birefringence, the light traveling back and forth through the regions $D_1$ and the light transmitted through back and forth through the regions $D_2$ both enter the polarization hologram 5 substantially in the form of circularly polarized light (light III in FIG. 2C). The polarization hologram 5 diffracts about half of the light (S-polarized component), and allows the other half of the light (P-polarized component) to be transmitted therethrough without being diffracted.

On the other hand, consider a case where the optical disk substrate has a large birefringence, such that there exists a birefringence equivalent to that of a ½ wavelength plate over the course of the back and forth trips of light. In this case, due to reflection at the optical disk, light would receive a polarization conversion similar to that which would occur when the light is transmitted through a ½ wavelength plate. Therefore, the light entering the polarization hologram 5 is in a polarization state (light III' in FIG. 2C) such that the major axis of the ellipse is perpendicular to that in the case where the optical disk substrate has no birefringence. Even in this case, the light traveling back and forth through the regions $D_1$ and the light and the light transmitted through back and forth through the regions $D_2$ are both circularly polarized light, although having different principal axis directions. Therefore, the polarization hologram 5 diffracts about half of the light (S-polarized component), and allows the other half of the light (P-polarized component) to be transmitted therethrough without being diffracted. In this case, the amount of light which is diffracted by the polarization hologram 5, i.e., the signal light amount, is not greatly reduced from the signal light amount in the case where the optical disk substrate has no birefringence.

Figure 3:
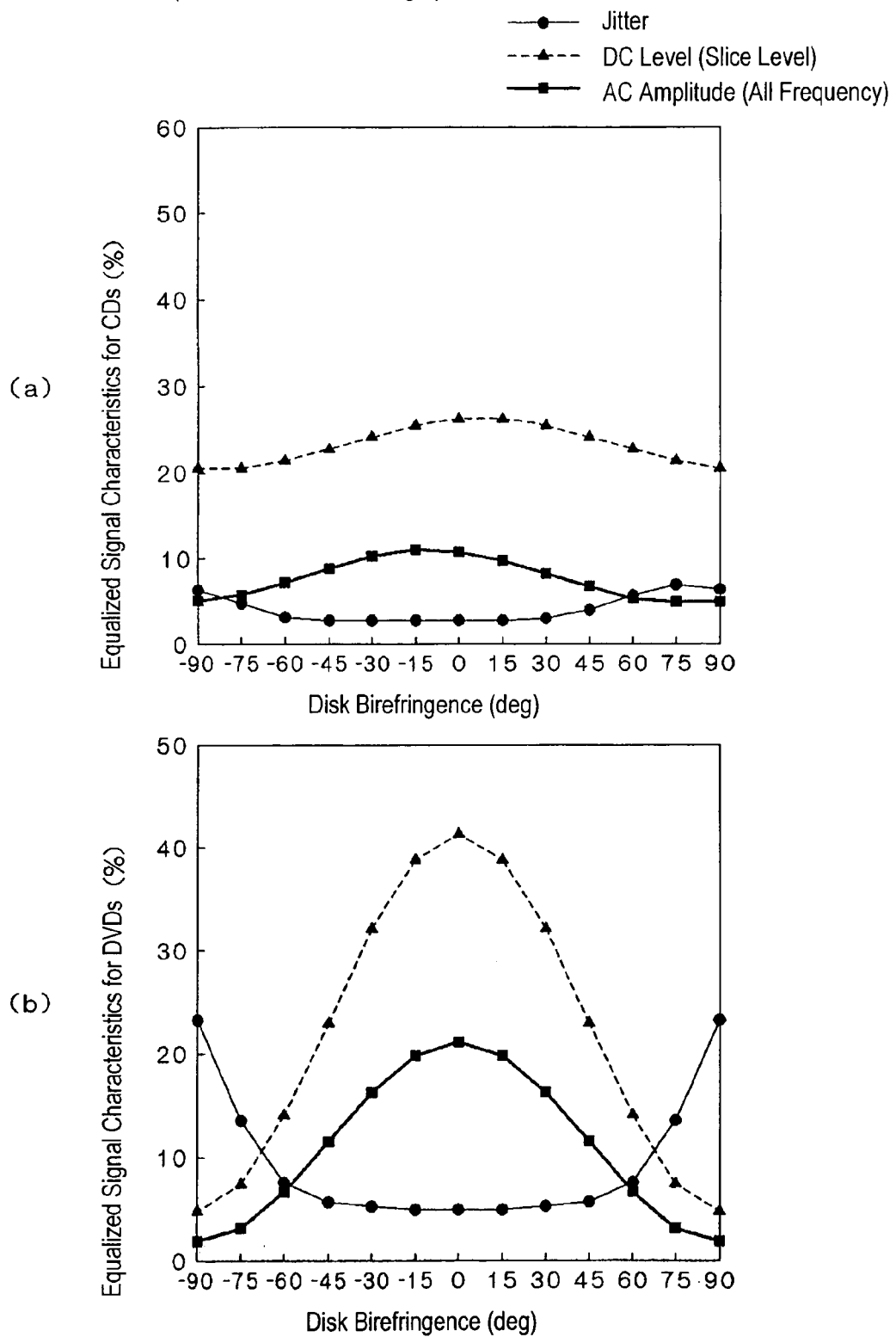
FIG. 3 includes: (a) a graph showing changes in the signal level and jitter value of light for CDs plotted against birefringence of the disk substrate, where an optical pickup incorporating an optical element according to Embodiment 1 is used; and (b) a graph showing changes in the signal level and jitter value of light for DVDs plotted against birefringence of the disk substrate, where an optical pickup incorporating an optical element according to Embodiment 1 is used.

FIG. 3 is a graph showing the relationship between degrees of birefringence (phase difference) of the optical disk and signal characteristics in the case where the wavelength plate 6 is employed. In FIG. 3, (a) relates to CDs, whereas (b) relates to DVDs. The retardation of the wavelength plate 6 used is 270° with respect to laser wavelength for DVDs, and 220° with respect to the laser light wavelength for CDs. The optic axis directions of the regions $D_1$ and regions $D_2$ are 45°±10°, respectively, with respect to the x axis. The horizontal axis of the graph represents the phase difference which is imparted to the light traveling back and forth through the optical disk substrate, whereas the vertical axis represents the jitter value (Jitter), DC level, and AC amplitude of the reproduction signal (RF signal).

As can be seen from a comparison between the graph of FIG. 3(b) and the graph of FIG. 16(b), laser light for DVDs is hardly affected by the increase of retardation to 270°. The substrate thickness of a DVD is half of the substrate thickness of a CD, and therefore a DVD has a small amount of birefringence (±60° or less). Therefore, with respect to DVDs, the wavelength plate 6 of the present embodiment can guarantee at least about ⅓ of the signal light amount of the case where the optical disk substrate has no birefringence.

On the other hand, as shown in (a) of FIG. 3, with respect to laser light for CDs, the light which enters the polarization hologram in the return path is near-circularly polarized light. Therefore, even in the absence of birefringence, the signal level is approximately halved. However, even if the optical disk substrate has a strong birefringence, there is only a very small decrease in the signal level. Therefore, by prescribing a gain which is about twice the conventional level for the electrical signal which is output from the photodetector, it becomes possible to obtain a substantially constant signal level notwithstanding the fluctuations in the amount of birefringence within a single CD, whereby stable signal reproduction performance can be attained.

Thus, according to the present embodiment, by prescribing a retardation near 270° for light of one of the wavelengths (note that similar effects would be obtained within a range of 270°±30°), the influence of birefringence on light of the other wavelength can be greatly reduced.

Between a 0° birefringence and a 90° birefringence, there is a point where either one of the light traveling back and forth through the regions $D_1$ and the light traveling back and forth through the regions $D_2$ turns into linearly polarized light which is identical to the incident polarized light in the forward path. At this point, the light is converted into P-polarized light which will not to be diffracted by the polarization hologram. However, even in this case, the other one of the light traveling back and forth through the regions $D_1$ and the light traveling back and forth through the regions $D_2$ is converted into elliptically polarized light having a large S-polarized light component. Therefore, as shown in (a) of FIG. 3, the signal level which is obtained from the light which has been transmitted through the wavelength plate 6 including the regions $D_1$ and $D_2$ is not reduced to zero. In other words, the effects of the present invention will not be obtained by prescribing a near-270° retardation for a uniform wavelength plate; rather, it is essential to prescribe a near-270° retardation for a distributed-type wavelength plate.

As can be seen from (a) of FIG. 3, the jitter is hardly aggravated even in the case where the CD has a large birefringence. The reason is that, since a plurality of regions having different optic axis directions are finely dispersed across the entire cross section of the ray transmitted through the wavelength plate 6, the equivalent aperture of the return path light is conserved, so that good light spot convergence on the detector surface is maintained. Furthermore, since the regions of the wavelength plate 6 are arranged so as to be symmetric with respect to radial and tangential directions of the optical disk, groove-diffracted light and pit-diffracted light from the optical disk enter the two types regions in the wavelength plate 6 with an equal probability. Even in the presence of a birefringence that results in a difference between the regions $D_1$ and the regions $D_2$, the influences on the tracking and focusing control signals can also be suppressed. In order to obtain such effects, it is preferable to divide the wavelength plate 6 into as fine regions as possible. The size of each region is preferably set to be about ⅒ or less of the diameter of the ray cross section as shown by a broken line in FIG. 2A, for example.

In the present embodiment, α is prescribed to be 15° or less. Moreover, in the present embodiment, the optic axis directions are equally distributed on the plus and minus sides with respect to the 45° angle from the polarization direction of the incident light. Since the birefringence of an optical disk substrate tends to be stronger in one polarity than in the other, the optic axis directions may be prescribed to be 45°+δ±α of the polarization direction of the incident light, where δ is an offset angle. In order to obtain nearly-perpendicular polarization states, it is preferable to prescribe δ within the range of −10°≦δ≦10°.

Although the present embodiment is directed to the case of employing laser light for DVDs and laser light for CDs, the optical pickup of the present invention is not limited to such cases. The present invention is also applicable to an optical pickup which employs a light source of a shorter wavelength, e.g., an optical pickup for Blu-ray discs, in which case an optical thickness which is in accordance with the wavelength can be prescribed. Specifically, even in the case where the aforementioned wavelength relationship (i.e., that between DVDs and CDs) is no longer true in terms of wavelength proportion, it might still be possible to optimize the refractive index dispersion of the material so as to simulate a similar relationship between DVDs and Blu-ray discs, for example.

Embodiment 2

Next, a second embodiment of the present invention will be described with reference to FIG. 4.

Figure 4A:
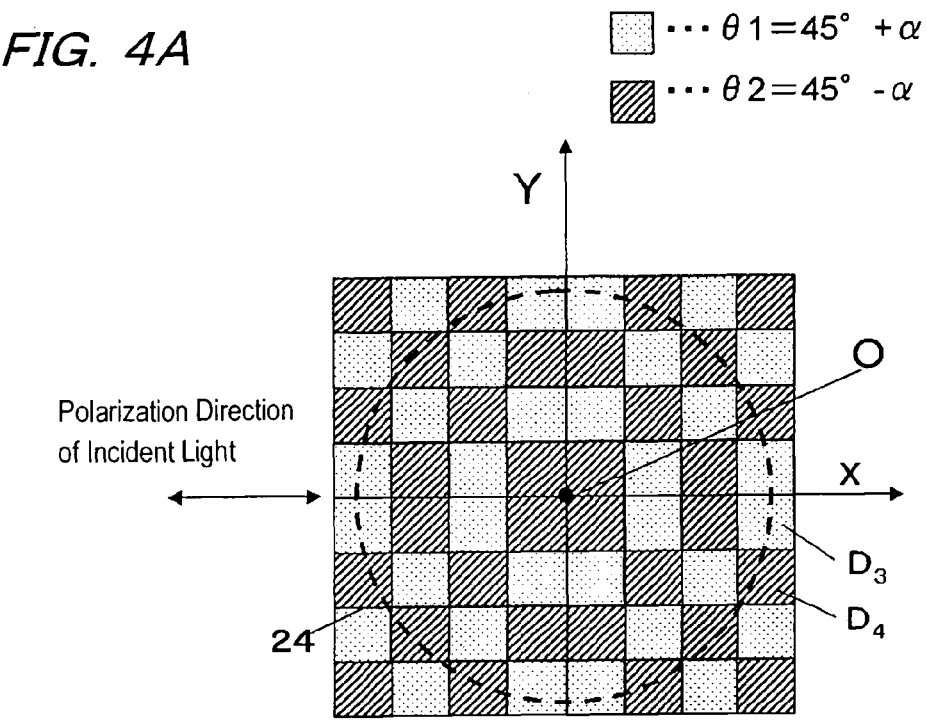
FIG. 4A is a plan view showing a wavelength plate according to Embodiment 2.
Figure 4B:
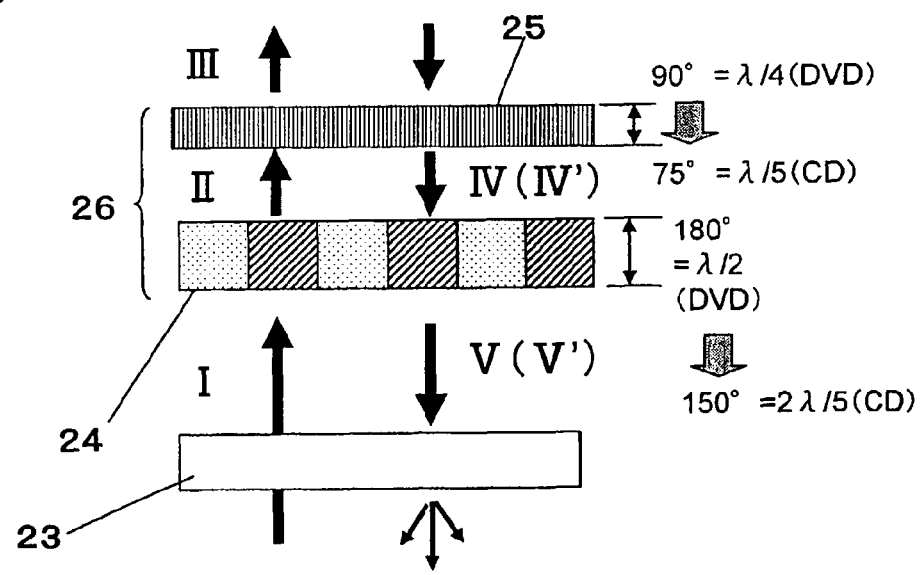
FIG. 4B is a partial side view showing an optical pickup including the wavelength plate according to Embodiment 2.

FIGS. 4A and 4B show the structure of a wavelength plate 26 according to the present embodiment. The wavelength plate 26 is composed of a combination of two types of wavelength plates (phase shift layers). FIG. 4B also shows a polarization hologram 23 to be used in conjunction with the wavelength plate 26.

The wavelength plate 26 of the present embodiment is composed of a distributed-type wavelength plate 24 and a uniform wavelength plate 25 which are stacked together. The distributed-type wavelength plate 24 has a retardation of 180° for light of the wavelength $\lambda_1$ (e.g., light for DVDs; wavelength 650 nm), and the uniform wavelength plate 25 has a retardation of 90° for light of the wavelength $\lambda_1$. As a result, the wavelength plate 26 as a whole has a retardation of 270° (=180°+90°) for light of the wavelength $\lambda_1$.

As shown in FIG. 4A, the distributed-type wavelength plate 24 has a similar structure to that of the distributed-type wavelength plate 6 of Embodiment 1. Each dot region $D_3$ has an optic axis direction which is at $\theta_1$ with respect to the x axis, and each hatched region $D_4$ has an optic axis direction which is at $\theta_2$ with respect to the x axis. The direction of the x or y axis respectively coincides with a radial direction or a track tangential direction of the optical disk. The center point O at which the x axis and the y axis intersect each other coincides with the center of the objective lens. The polarization direction of linearly polarized light which enters the wavelength plate 26 from the light source side coincides with the x axis. In the present embodiment, the angles $\theta_1$ and $\theta_2$ are $45°-\alpha$ and $45°+\alpha$ (where $0<\alpha\leq15°$) with respect to the x axis direction, respectively.

As shown in FIG. 4B, light I which enters the distributed-type wavelength plate 24 from the light source side is converted into light II, whose polarization state has been changed, by being transmitted through the distributed-type wavelength plate 24. The light II is transmitted through the uniform wavelength plate 25 to be converted into light III which enters an optical information medium (not shown in FIG. 4B). The light which has been reflected from the optical information medium is transmitted back through the uniform wavelength plate 25, thereby being converted into light IV. The light IV is further converted by the distributed-type wavelength plate 24 into light V which enters the polarization hologram 23.

In the present embodiment, among the rays which are radiated from the light source and enter the distributed-type wavelength plate 26, those rays which pass through a region $D_3$ are reflected from the optical disk, and thereafter will pass through a region $D_3$ which is at a symmetric position from the aforementioned region $D_3$ with respect to the optical axis. Similarly, those rays which pass through a region $D_4$ will travel through a corresponding region $D_4$ in a symmetric position after being reflected from the optical disk.

For light of the wavelength $\lambda_1$, the retardation (270°) of the wavelength plate 26 is equal to the retardation of a ¾ wavelength plate. Since the light twice travels through the wavelength plate 26 over the course of the back and forth trips, the wavelength plate 26 functions as a 3/2 wavelength plate (i.e., ½ wavelength plate). If the substrate of the optical disk has no birefringence, light which is nearly in the form of linearly polarized light that is substantially perpendicular to the linearly polarized light in the forward path enters the polarization hologram 23, although there is a slight difference in polarization directions between the regions $D_3$ and the regions $D_4$. This behavior is identical to the behavior in the case where the wavelength plate 26 has a retardation of 90°. On the other hand, the retardation of the wavelength plate 26 for light of the other wavelength $\lambda_2$ (e.g., laser light for CDs; wavelength 800 nm) is about 225°, which is equal to the retardation of a ⅝ wavelength plate.

Figure 4C:
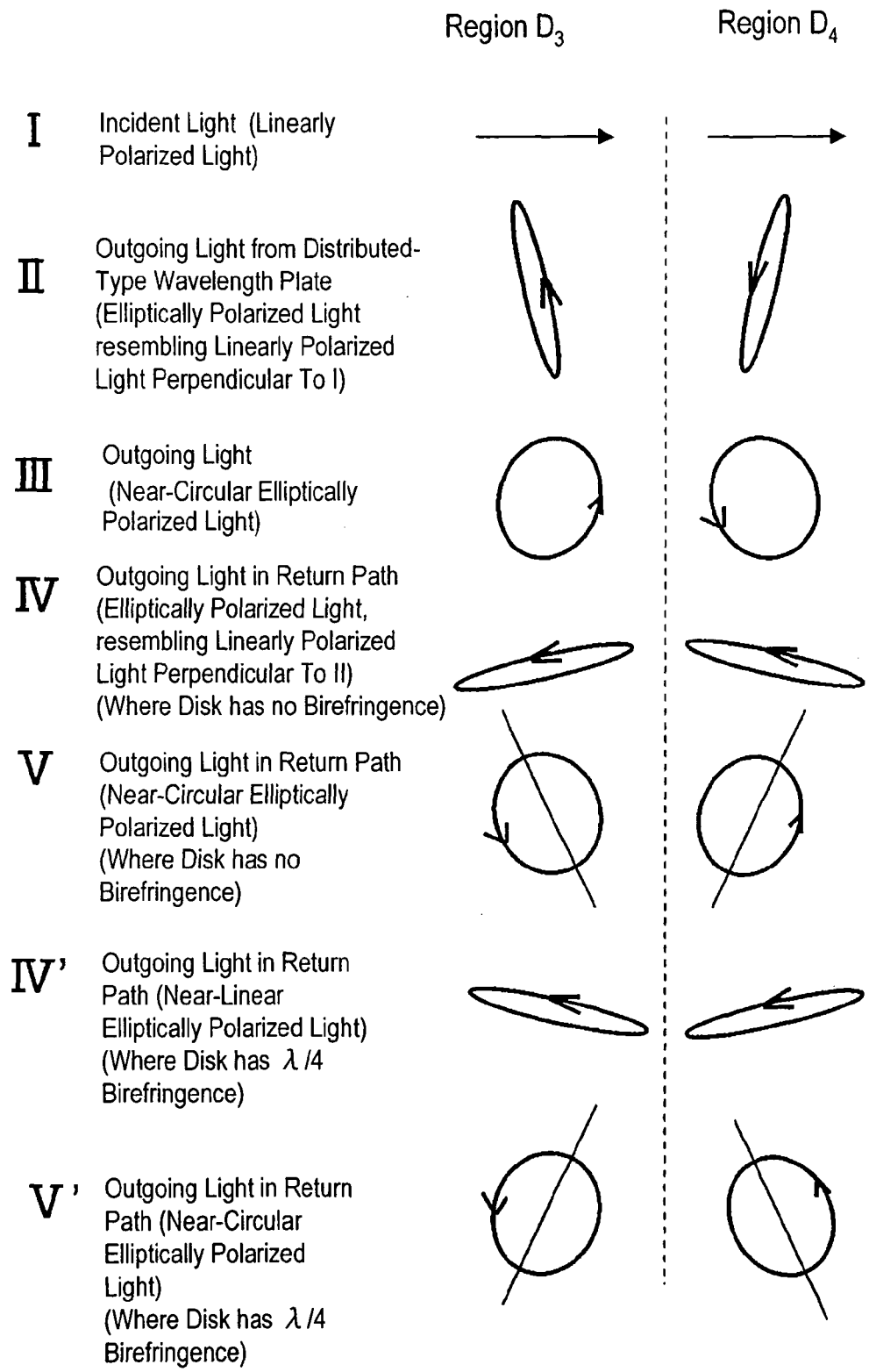
FIG. 4C is a chart showing manners in which polarization states are changed by the wavelength plate according to Embodiment 2.

FIG. 4C shows polarization conversions for light of the wavelength $\lambda_2$.

Since light of the wavelength $\lambda_2$ twice travels through the wavelength plate 26 over the course of the back and forth trips, the wavelength plate 26 functions as a 5/4 wavelength plate (i.e., ¼ wavelength plate). If the substrate of the optical disk has no birefringence, the light V enters the polarization hologram 23 in the form of near-circularly polarized light. The polarization hologram 23 diffracts about half of the light V, and allows the other half to be transmitted therethrough without being diffracted.

In the case where the optical disk substrate has a large birefringence, such that the substrate functions as a ½ wavelength plate over the course of the back and forth trips of light, polarized light whose fast axis is perpendicular to that of the polarized light of the case where there is no birefringence occurs. However, this light is also elliptically polarized light that is nearly circularly-polarized. In other words, the polarization hologram 23 diffracts about half of the light, while allowing the other half to be transmitted therethrough without being diffracted. Therefore, the amount of light which is diffracted by the polarization hologram 23, i.e., the signal light amount, is substantially equal to the signal light amount in the case where the optical disk substrate has no birefringence.

Figure 5:
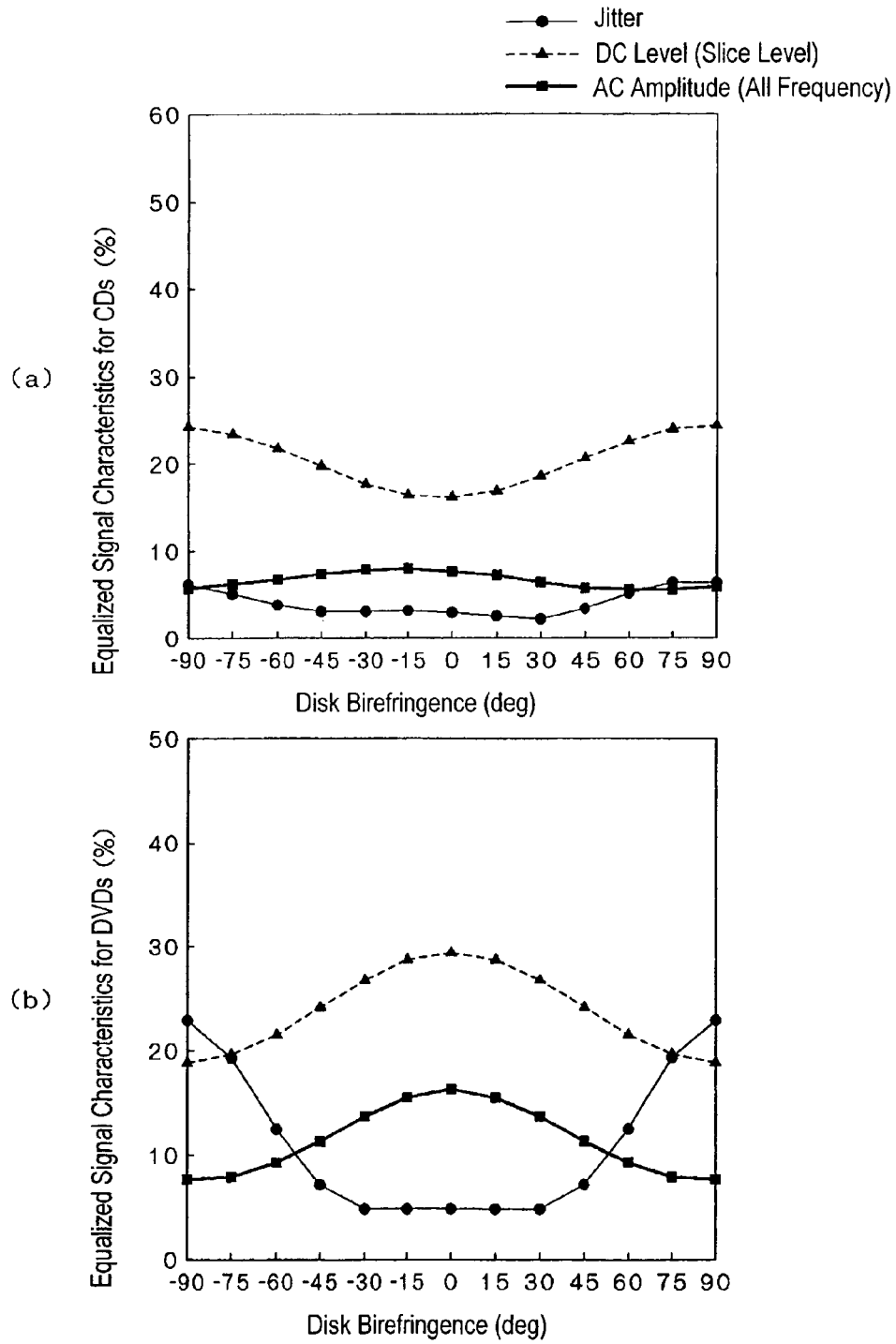
FIG. 5 includes: (a) a graph showing changes in the signal level and jitter value of light for CDs plotted against birefringence of the disk substrate, where an optical pickup incorporating an optical element according to Embodiment 2 is used; and (b) a graph showing changes in the signal level and jitter value of light for DVDs plotted against birefringence of the disk substrate, where an optical pickup incorporating an optical element according to Embodiment 2 is used.

FIG. 5 is a graph showing the relationship between degrees of birefringence (phase difference) of the optical disk and signal characteristics in the case where the wavelength plate 26 is employed. In FIG. 5, (a) relates to CDs, whereas (b) relates to DVDs. The retardation of the wavelength plate 26 used is 270° with respect to laser wavelength for DVDs, and 220° with respect to the laser light wavelength for CDs. The optic axis directions of the regions $D_3$ and regions $D_4$ are 45°±10°, respectively, with respect to the x axis. The horizontal axis of the graph represents the phase difference which is imparted to the light traveling back and forth through the optical disk substrate, whereas the vertical axis represents the jitter value (Jitter), DC level, and AC amplitude of the reproduction signal (RF signal).

The substrate thickness of a DVD is half of the substrate thickness of a CD, and therefore a DVD generally has only a small amount of birefringence. Therefore, its deterioration is within a small range despite changing signal levels. With respect to laser light for CDs, as shown in (a) of FIG. 5, the signal DC level decreases as the birefringence decreases, but only with small amounts of change. Thus, a substantially constant signal level is obtained notwithstanding fluctuations in the amount of birefringence within a single optical disk, whereby stable signal reproduction performance can be attained.

Moreover, with respect to both CDs and DVDs, there is little jitter aggravation associated with birefringence. Again, this is a result of finely dispersing the split regions of different properties across the entire ray cross section.

Embodiment 3

Next, a third embodiment of the present invention will be described with reference to FIG. 6.

Figure 6A:
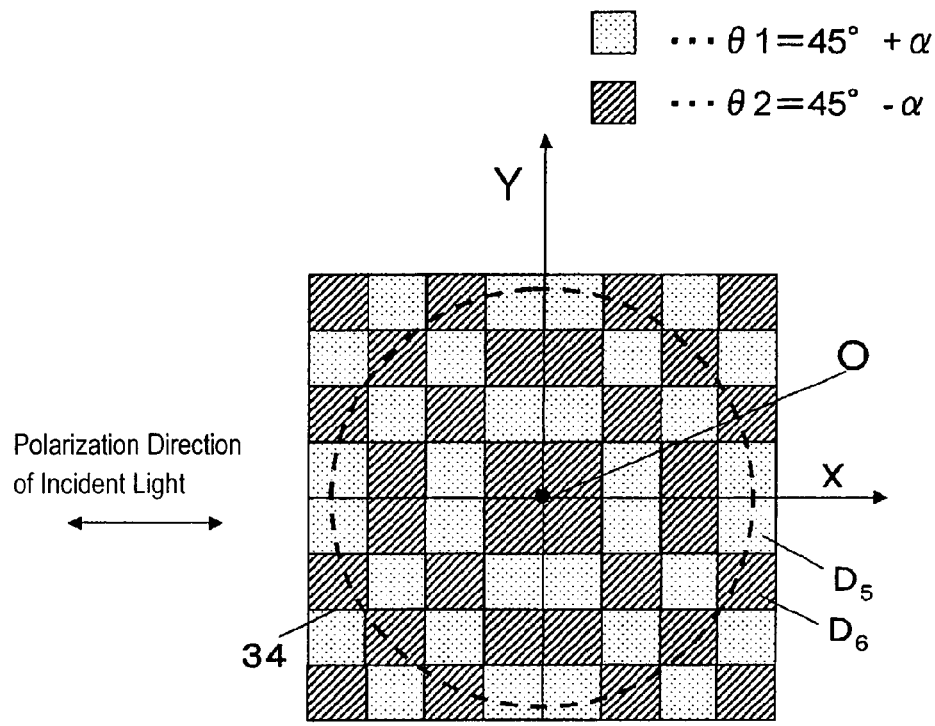
FIG. 6A is a plan view showing a wavelength plate according to Embodiment 3.
Figure 6B:
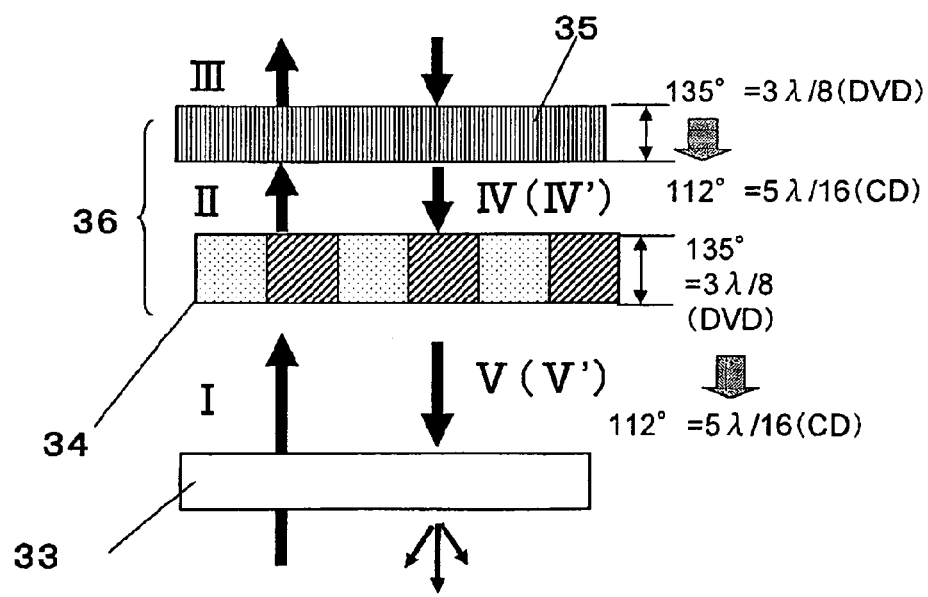
FIG. 6B is a partial side view showing an optical pickup including the wavelength plate according to Embodiment 3.

FIGS. 6A and 6B show the structure of a wavelength plate 36 according to the present embodiment. The wavelength plate 36 is also composed of a combination of two types of wavelength plates (phase shift layers). FIG. 6B also shows a polarization hologram 33 to be used in conjunction with the wavelength plate 36.

The wavelength plate 36 of the present embodiment is composed of a distributed-type wavelength plate 34 and a uniform wavelength plate 35 which are stacked together. The distributed-type wavelength plate 34 has a retardation of 135° for light of the wavelength $\lambda_1$ (e.g., light for DVDs; wavelength 650 nm), and the uniform wavelength plate 35 also has a retardation of 135° for light of the wavelength $\lambda_1$. As a result, the wavelength plate 36 as a whole has a retardation of 270° (=135°+135°) for light of the wavelength $\lambda_1$.

As shown in FIG. 6A, the distributed-type wavelength plate 34 has a similar structure to that of the distributed-type wavelength plate 26 of Embodiment 2. Each dot region $D_5$ has an optic axis direction which is at $\theta_1$ with respect to the x axis, and each hatched region $D_6$ has an optic axis direction which is at $\theta_2$ with respect to the x axis. The direction of the x or y axis respectively coincides with a radial direction or a track tangential direction of the optical disk. The center point O at which the x axis and the y axis intersect each other coincides with the center of the objective lens. The polarization direction of linearly polarized light which enters the wavelength plate 26 from the light source side coincides with the x axis. In the present embodiment, the angles $\theta_1$ and $\theta_2$ are 45°−α and 45°+α (where 0<α≦15°) with respect to the x axis direction, respectively.

As shown in FIG. 6B, light I which enters the distributed-type wavelength plate 34 from the light source side is converted into light II, whose polarization state has been changed, by being transmitted through the distributed-type wavelength plate 34. The light II is transmitted through the uniform wavelength plate 35 to be converted into light III which enters an optical information medium (not shown in FIG. 6B). The light which has been reflected from the optical information medium is transmitted back through the uniform wavelength plate 35, thereby being converted into light IV. The light IV is further converted by the distributed-type wavelength plate 34 into light V which enters the polarization hologram 33.

In the present embodiment, among the rays which are radiated from the light source and enter the wavelength plate 36, those rays which pass through a region $D_5$ are reflected from the optical disk, and thereafter will pass through a region $D_5$ which is at a symmetric position from the aforementioned region $D_5$ with respect to the optical axis. Similarly, those rays which pass through a region $D_6$ will travel through a corresponding region $D_6$ in a symmetric position after being reflected from the optical disk.

For light of the wavelength $\lambda_1$, the retardation (270°=135°+135°) of the wavelength plate 36 is equal to the retardation of a ¾ wavelength plate. Since the light twice travels through the wavelength plate 36 over the course of the back and forth trips, the wavelength plate 36 functions as a 3/2 wavelength plate (i.e., ½ wavelength plate). If the substrate of the optical disk has no birefringence, light which is nearly in the form of linearly polarized light that is substantially perpendicular to the linearly polarized light in the forward path enters the polarization hologram 33, although there is a slight difference in polarization directions between the regions $D_5$ and the regions $D_6$. This behavior is identical to the behavior in the case where the wavelength plate 36 has a retardation of 90°. On the other hand, the retardation of the wavelength plate 36 for light of the other wavelength $\lambda_2$ (e.g., laser light for CDs; wavelength 800 nm) is about 225°, which is equal to the retardation of a ⅝ wavelength plate.

Therefore, as in the cases of Embodiments 1 and 2, even if the disk substrate has a large birefringence which is equivalent to that of a ½ wavelength plate, the result is that elliptically polarized light that is nearly circularly-polarized has its major axis rotated. Thus, the polarization hologram 33 diffracts about half of the light, while allowing the other half to be transmitted therethrough without being diffracted. Therefore, the amount of light which is diffracted by the polarization hologram 33, i.e., the signal light amount, is substantially equal to the signal light amount in the case where the optical disk substrate has no birefringence.

Figure 7:
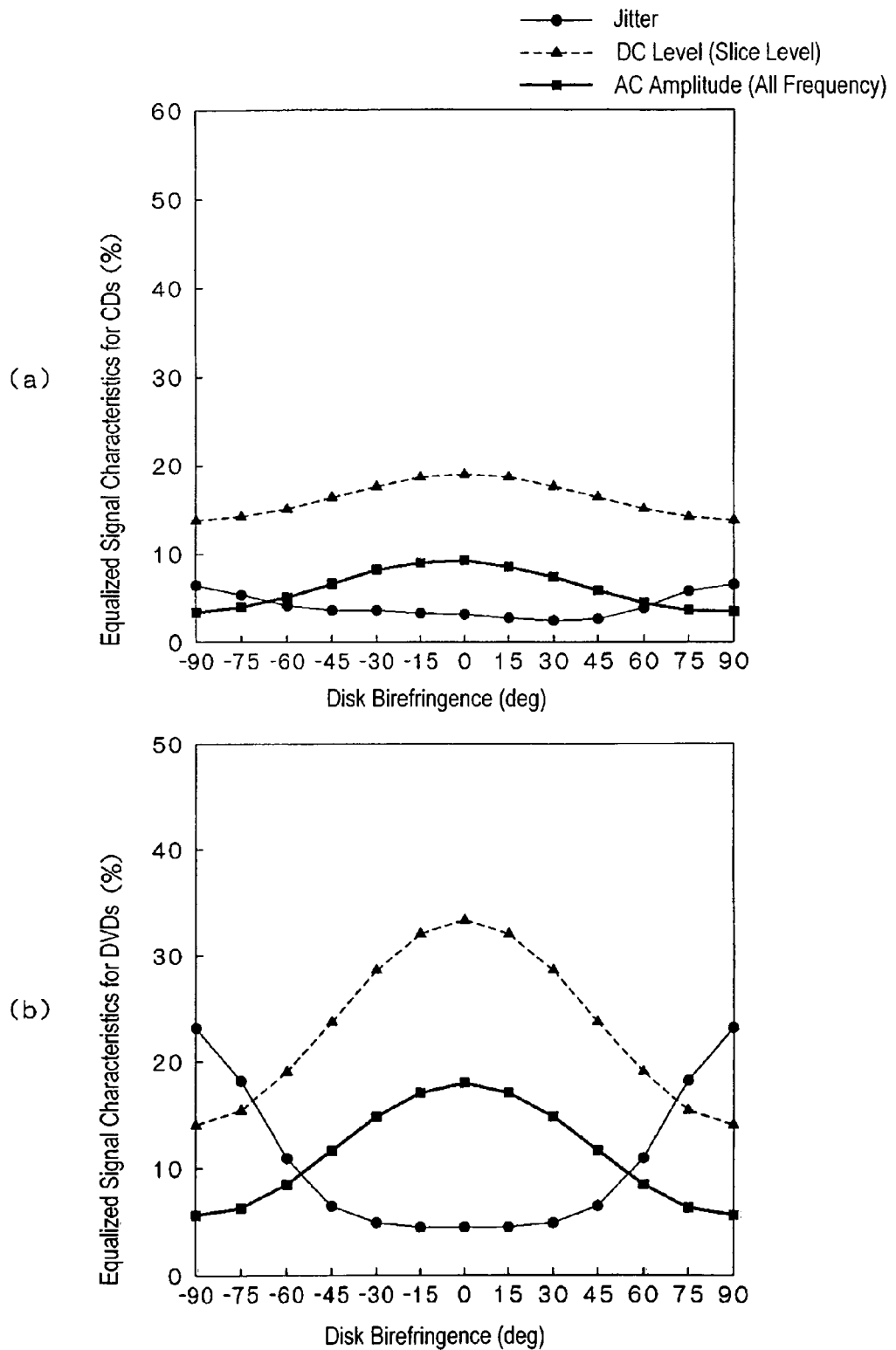
FIG. 7 includes: (a) a graph showing changes in the signal level and jitter value of light for CDs plotted against birefringence of the disk substrate, where an optical pickup incorporating an optical element according to Embodiment 3 is used; and (b) a graph showing changes in the signal level and jitter value of light for DVDs plotted against birefringence of the disk substrate, where an optical pickup incorporating an optical element according to Embodiment 3 is used.

FIG. 7 is a graph showing the relationship between degrees of birefringence (phase difference) of the optical disk and signal characteristics in the case where the wavelength plate 36 is employed. In FIG. 7, (a) relates to CDs, whereas (b) relates to DVDs. The retardation of the wavelength plate 36 used is 270° with respect to laser wavelength for DVDs, and 220° with respect to the laser light wavelength for CDs. The optic axis directions of the regions $D_5$ and regions $D_6$ are 45°±10°, respectively, with respect to the x axis. The horizontal axis of the graph represents the phase difference which is imparted to the light traveling back and forth through the optical disk substrate, whereas the vertical axis represents the jitter value (Jitter), DC level, and AC amplitude of the reproduction signal (RF signal).

The substrate thickness of a DVD is half of the substrate thickness of a CD, and therefore a DVD generally has only a small amount of birefringence. Therefore, its deterioration is within a small range despite changing signal levels. With respect to laser light for CDs, as shown in (a) of FIG. 7, the signal DC level decreases as the birefringence decreases, but only with small amounts of change. Thus, a substantially constant signal level is obtained notwithstanding fluctuations in the amount of birefringence within a single optical disk, whereby stable signal reproduction performance can be attained.

Moreover, with respect to both CDs and DVDs, there is little jitter aggravation associated with birefringence. Again, this is a result of finely dispersing the split regions of different properties across the entire ray cross section.

Figure 16:
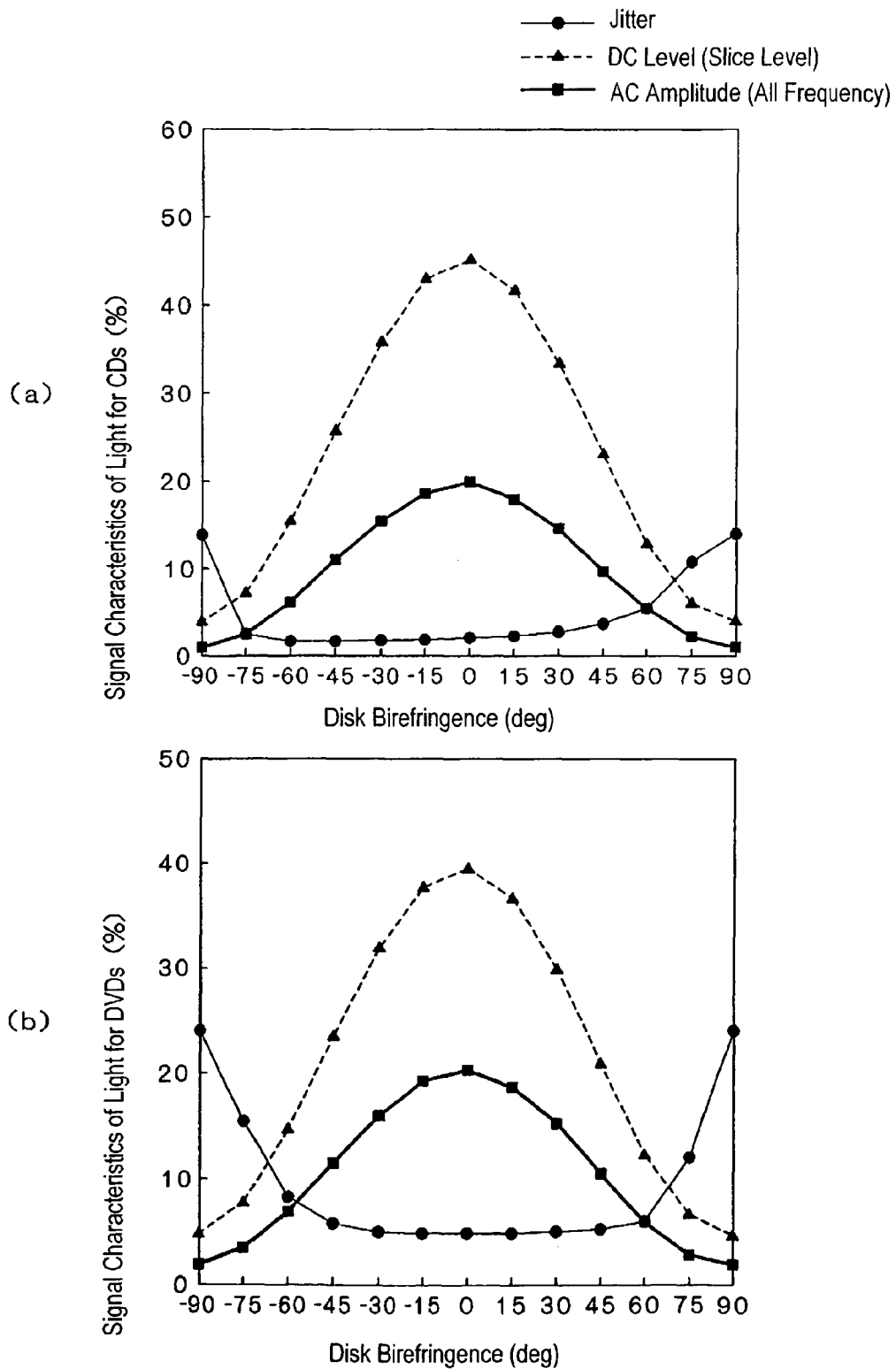
FIG. 16 includes: (a) a graph showing the signal level and jitter characteristics of light for CDs against disk birefringence, where the optical pickup of FIG. 14 is used; and (b) a graph showing the signal level and jitter characteristics of light for DVDs against disk birefringence, where the same optical pickup is used.
Figure 17:
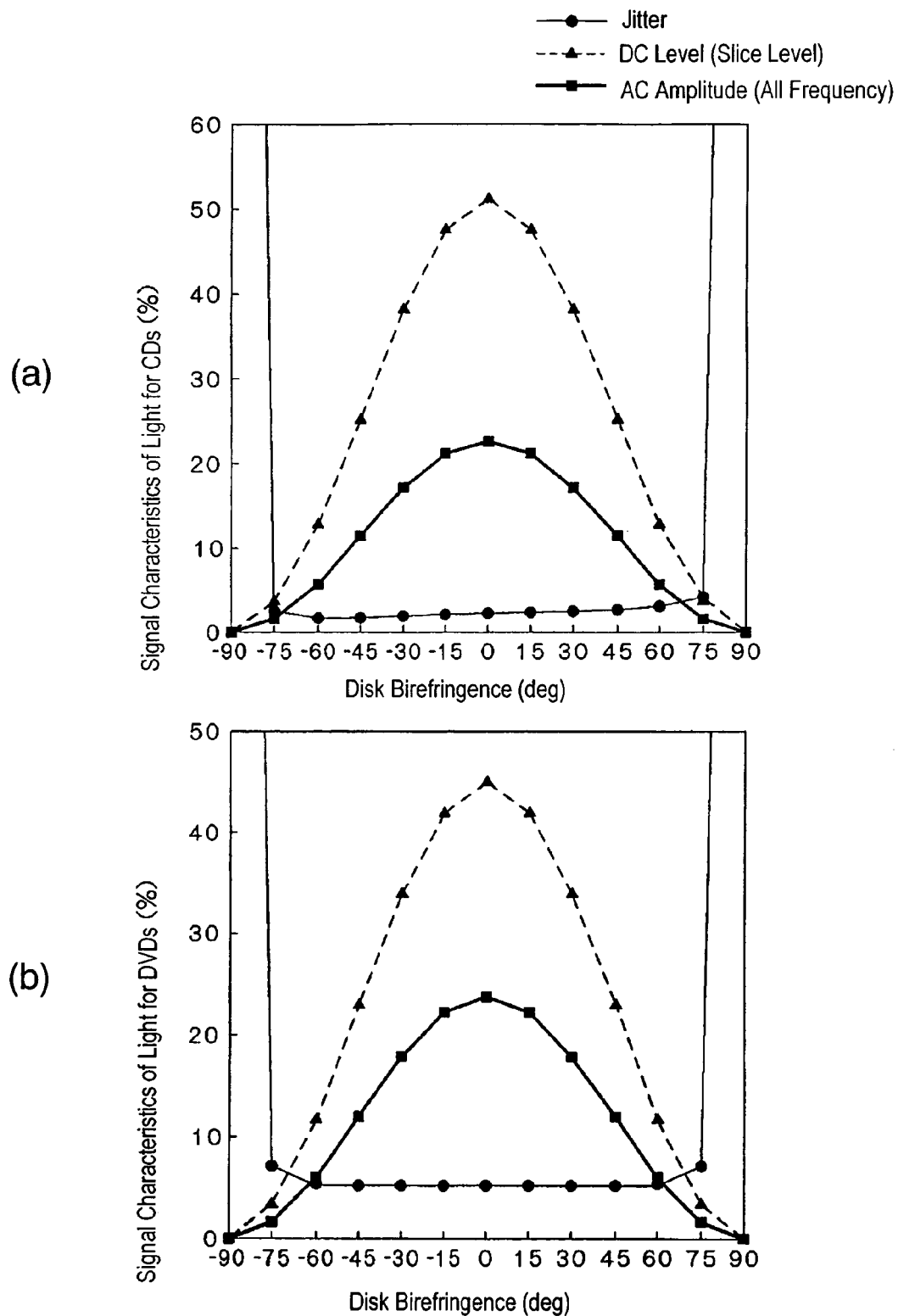
FIG. 17 includes: (a) a graph showing the signal level and jitter characteristics of light for CDs against disk birefringence, where an optical pickup incorporating a uniform wavelength plate is used; and (b) a graph showing the signal level and jitter characteristics of light for DVDs against disk birefringence, where an optical pickup incorporating a uniform wavelength plate is used.

In the case of CDs, when the optical disk substrate has no birefringence, the signal level is reduced to about ½ of that obtained with the distributed-type wavelength plate described with reference to FIG. 16. However, it must be noted that the decrease in signal level is small even if the substrate has a large birefringence. Thus, a substantially constant signal level is obtained notwithstanding fluctuations in the amount of birefringence within a single disk, whereby stable signal reproduction performance can be attained.

Thus, as long as a total retardation of the wavelength plate which combines a distributed-type wavelength plate and a uniform wavelength plate is 270° (±30° or less) with respect to laser light for DVDs and 225° (±25° or less) with respect to laser light for CDs, the retardation of each individual wavelength plate in the stacked structure may have any other value. The number of wavelength plates to be stacked is not limited to two.

Embodiment 4

Figure 8:
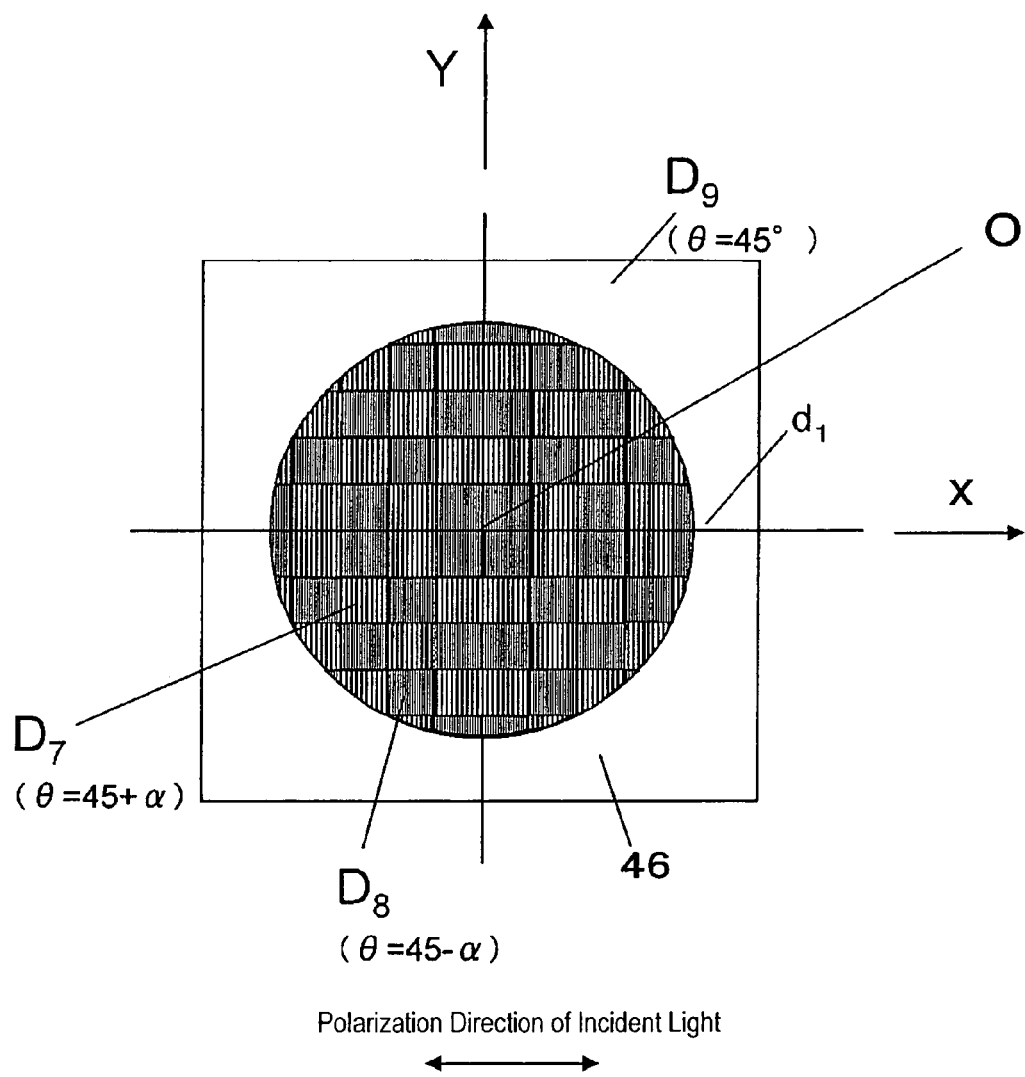
FIG. 8 is a plan view showing an optical element according to Embodiment 4 of the present invention.

FIG. 8 shows an example where the regions of the wavelength plate are divided in a different manner from those in the above embodiments. A wavelength plate 46 shown in FIG. 8 includes a peripheral region $D_9$, and a circular region in which regions $D_7$ and $D_8$ of different optic axis directions are arranged in a check pattern. The optical axis directions of the regions $D_7$ and $D_8$ are prescribed to be $45°\pm\alpha$ with respect to the polarization direction of the incident light. In the present embodiment, the region $D_9$ has a uniform refractive index anisotropy, and has an optic axis direction which is 45° from the polarization direction of the incident light. The diameter (d1) of the circular region corresponds to the aperture size of an optical system to be used for optical disks having a relatively low recording density (e.g. CDs). The region outside the circular region is prescribed to a size accommodating the aperture size of an optical system to be used for optical disks having a relatively high recording density (e.g. DVDs). Thus, it is possible to obtain effects of a distributed-type wavelength plate for optical disks whose substrates have a large birefringence (e.g., CDs for which a low-NA lens is used for recording/reproduction), while also suppressing deterioration of spatial-frequency characteristics in the case where a high-NA lens is used.

Embodiment 5

Next, a fifth embodiment of the present invention will be described with reference to FIG. 9.

Figure 9A:
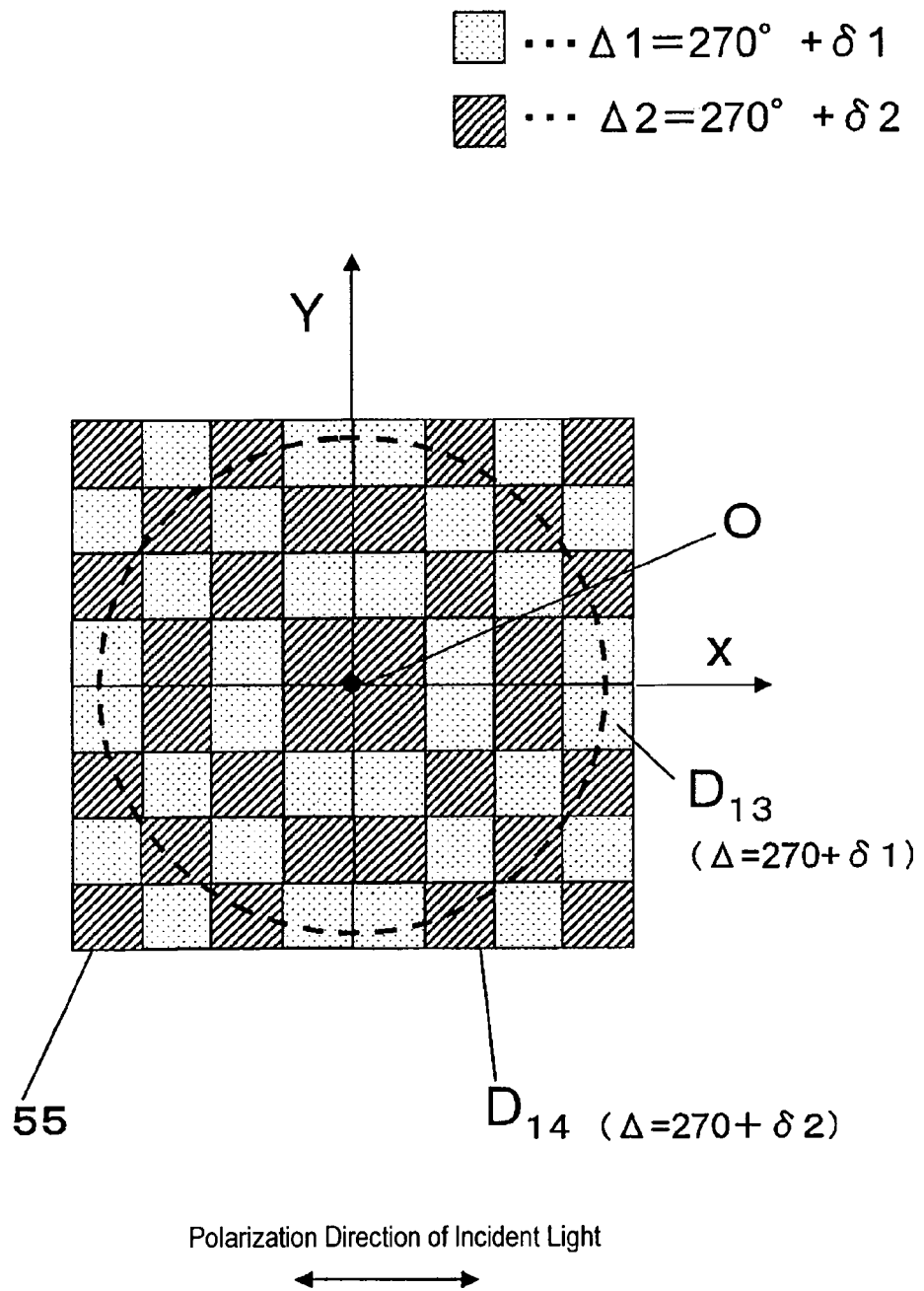
FIG. 9A is a plan view showing an optical element according to Embodiment 5 of the present invention.

FIG. 9A shows the structure of a wavelength plate 55 according to the present embodiment. In the wavelength plate 55, two types of regions having different properties are placed in an alternate arrangement within a plane. However, there is a difference from the above embodiments in that the respective regions have the same optic axis direction, although they have different retardations.

With respect to light of the wavelength $\lambda_1$ (e.g., light of the wavelength of 650 nm), the retardation of regions $D_{13}$ is prescribed to be $270°+\delta 1$ (where $0<\delta 1 \leq 30°$), and the retardation of regions $D_{14}$ is prescribed to be $270°-\delta 2$ (where $0<\delta 2 \leq 30°$). In other words, with respect to light of the wavelength $\lambda_1$ (e.g., light of the wavelength of 650 nm), the wavelength plate 55 functions substantially as a ¾ wavelength plate as a whole. On the other hand, with respect to light of the wavelength $\lambda_2$ (e.g., light for CDs; wavelength 800 nm), the regions $D_{13}$ have a retardation of about $225°+5\delta 1/6$, and the regions $D_{14}$ have a retardation of about $225°-5\delta 2/6$. In other words, with respect to light of the wavelength $\lambda_2$, the wavelength plate 55 substantially functions as a $5\lambda/8$ plate.

Light entering the wavelength plate 55 from the light source side, is subjected to a polarization conversion by the wavelength plate 55 while being transmitted therethrough. Light reflected from the optical information medium is again subjected to a polarization conversion by the wavelength plate 55 while being transmitted therethrough.

The wavelength plate 55 includes regions arranged in a check pattern, in which regions having the same retardation are present in symmetric positions, both with respect to an optical axis center and lines (x axis, y axis) extending through the optical axis center. The direction of the x or y axis respectively coincides with a radial direction or a track tangential direction of the optical disk. The center point at which the x axis and the y axis intersect each other coincides with the center of the objective lens. The polarization direction of linearly polarized light which enters the wavelength plate 55 from the light source side coincides with the x axis.

The optic axis direction of both regions $D_{13}$ and $D_{14}$ is at an angle of 45° with respect to the x axis direction. In accordance with the division pattern of the present embodiment, those rays from the light source which pass through a region $D_{13}$ are converged by the lens and reflected from the optical information medium, and thereafter will pass through a region $D_{13}$ which is at a symmetric position from the aforementioned region $D_{13}$ with respect to the optical axis. Similarly, those rays which pass through a region $D_{14}$ are reflected from the optical information medium, and will travel through a corresponding region $D_{14}$ in a symmetric position in the return path. Now, the wavelength plate has a retardation of about 270° with respect to light of one wavelength $\lambda_1$ (e.g. light for DVDs; wavelength 650 nm), thus corresponding to a ¾ wavelength plate. Therefore, while traveling twice through the wavelength plate 55 over the course of the back and forth trips, light of the wavelength $\lambda_1$ will experience a substantially 3/2 wavelength plate (i.e., a substantially ½ wavelength plate). Thus, if the disk substrate has no birefringence, the light will enter the polarization hologram nearly in the form of linearly polarized light which is perpendicular to that in the forward path. This operation is identical to the case, as illustrated in the description of the related art, where the wavelength plate has a 90° retardation.

On the other hand, with respect to the other wavelength $\lambda_2$ (e.g., light for CDs; wavelength 800 nm), the wavelength plate 55 has a retardation of about 225° (as known from wavelength proportion), thus corresponding to a substantially ⅝ wavelength plate. Therefore, while traveling twice through the wavelength plate 55 over the course of the back and forth trips, light of the wavelength $\lambda_2$ will experience a substantially 5/4 wavelength plate (i.e., a substantially ¼ wavelength plate). Thus, if the disk substrate has no birefringence, the light will enter the polarization hologram in the form of near-circularly polarized light in the return path of the optical system. Therefore, the polarization hologram diffracts about half of the light, while allowing the other half to be transmitted therethrough without being diffracted.

In the case where the optical disk substrate has a large birefringence, such that the substrate functions as a ½ wavelength plate over the course of the back and forth trips of light, polarized light whose fast axis is perpendicular to that of the circularly polarized light of the case where there is no birefringence enters the polarization hologram in the return path. However, this light is also elliptically polarized light that is nearly circularly-polarized. In other words, the polarization hologram similarly diffracts about half of the light, while allowing the other half to be transmitted therethrough without being diffracted, also in this case. Therefore, the amount of light which is diffracted by the polarization hologram, i.e., the signal light amount, is substantially equal to the signal light amount in the case where the optical disk substrate has no birefringence. In other words, the differentiated retardations within the plane of the wavelength plate realize the effects of a distributed-type wavelength plate, as attained by the structures of Embodiments 1 to 4, where the optical anisotropy axes are differentiated within the device plane. Again, the structure of the present embodiment becomes effective only in the context of a distributed-type wavelength plate, where regions of different properties exist within the device plane.

Figure 9B:
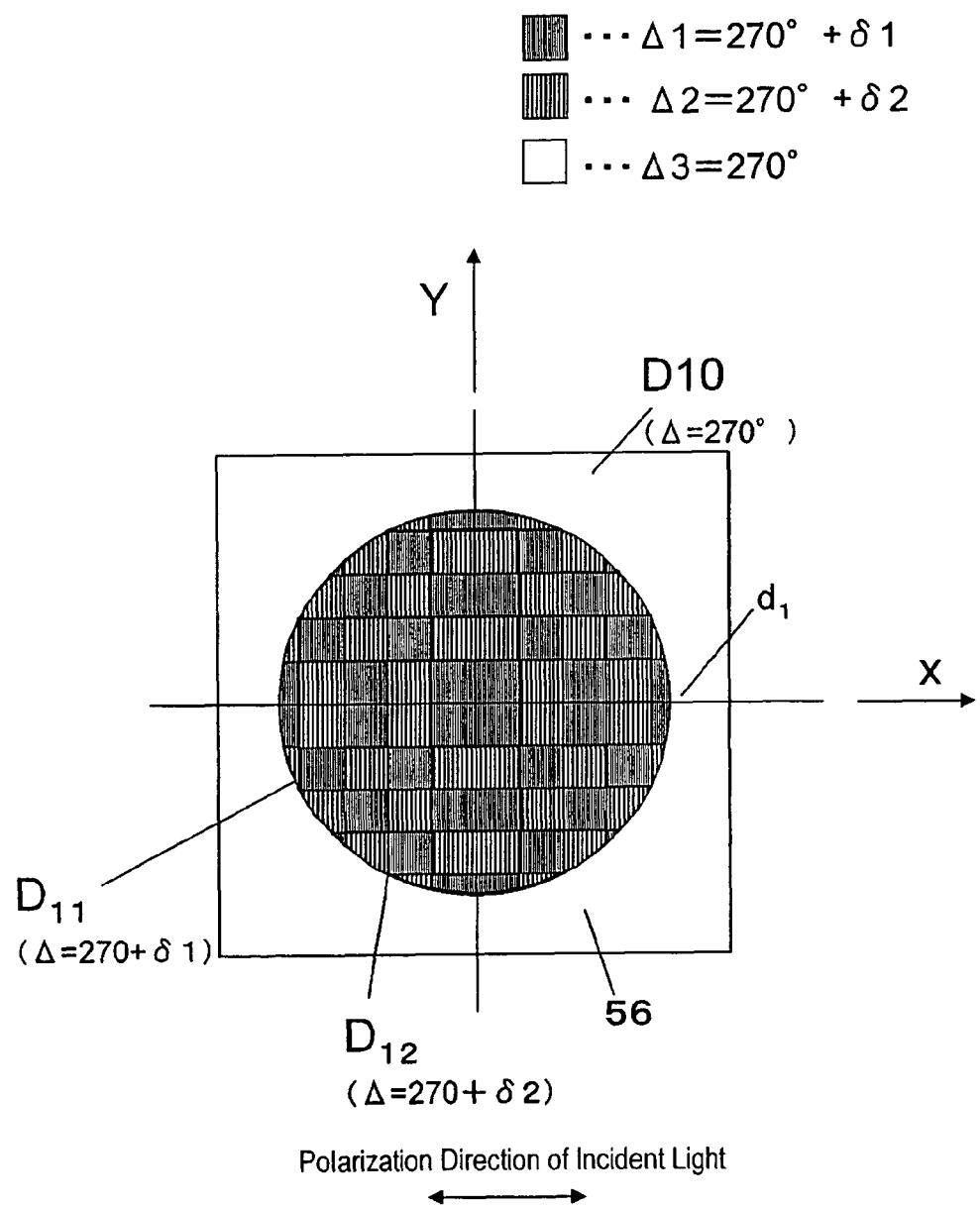
FIG. 9B is a plan view showing another optical element according to Embodiment 5.

FIG. 9B shows a wavelength plate 56, in which two types of regions having different properties are also placed in an alternate arrangement within a plane, although the regions of different retardations are placed in a different arrangement from that of the embodiment illustrated in FIG. 9A.

The wavelength plate 56 shown in FIG. 9B includes a peripheral region $D_{10}$, and a circular region in which regions $D_{11}$ and $D_{12}$ of different retardations are arranged in a check pattern. With respect to light of the wavelength $\lambda_1$ (e.g., light of the wavelength of 650 nm), the retardation of the regions $D_{11}$ is prescribed to be $270°+\delta1$ ($0<\delta1\leq30°$), and the retardation of the regions $D_{12}$ is prescribed to be $270°-\delta2$ ($0<\delta2\leq30°$). The peripheral region $D_{10}$ has a uniform retardation of 270°. With respect to light of the wavelength $\lambda_1$ (e.g., light of the wavelength of 650 nm), this wavelength plate 56 functions substantially as a ¾ wavelength plate as a whole.

The diameter (d1) of the circular region corresponds to the aperture size of an optical system to be used for optical disks having a relatively low recording density (e.g. CDs). The region outside the circular region is prescribed to a size accommodating the aperture size of an optical system to be used for optical disks having a relatively high recording density (e.g. DVDs). Thus, it is possible to obtain effects of a distributed-type wavelength plate for optical disks whose substrates have a large birefringence (e.g., CDs for which a low-NA lens is used for recording/reproduction), while also suppressing deterioration of spatial-frequency characteristics in the case where a high-NA lens is used.

Next, with reference to FIG. 10, an embodiment of a method for producing a wavelength plate according to the present invention will be described. Herein, a method for producing the wavelength plate of Embodiment 1 will be illustrated as an example.

The distributed-type wavelength plate to be produced in the present embodiment includes a liquid crystal layer interposed between two transparent substrates.

Figure 10:
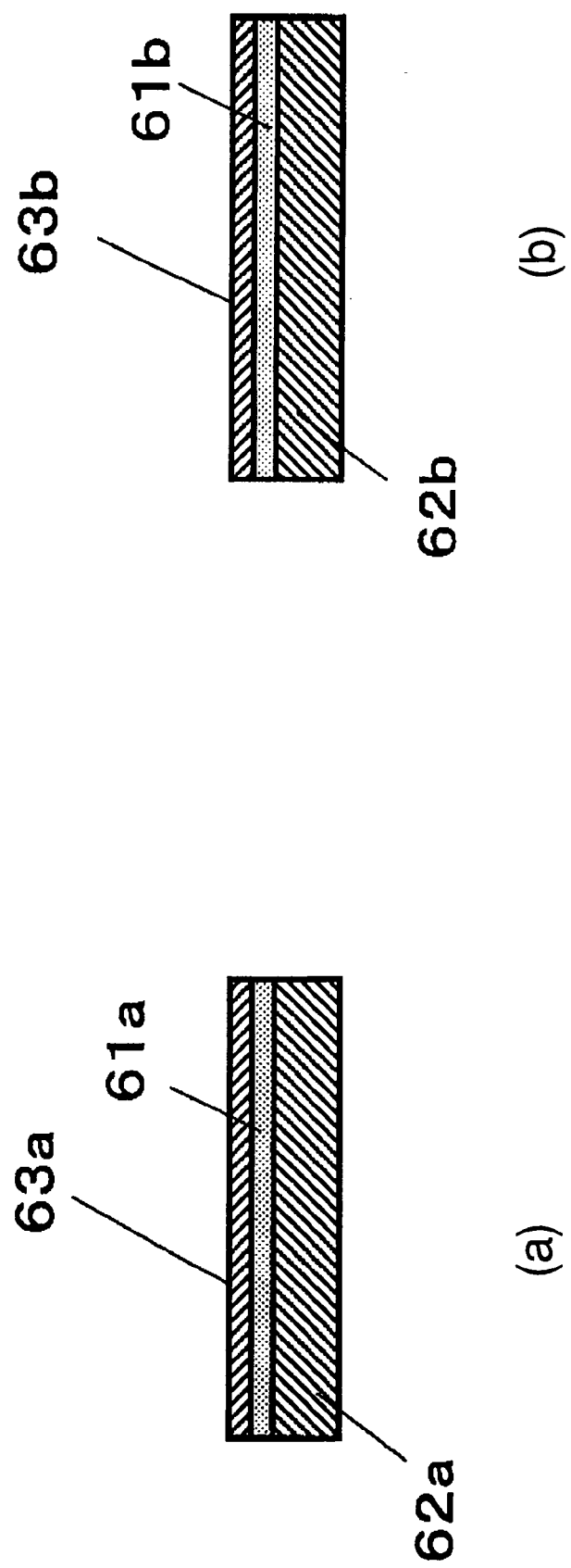
FIG. 10 includes (a) and (b), which are diagrams each showing a transparent substrate and an alignment film in a method for producing a distributed-type wavelength plate according to each embodiment of the present invention.

First, as shown in FIG. 10, transparent substrates 61a and 61b on which transparent electrode films 62a and 62b (made of ITO, for example), respectively, are formed are prepared. An alignment material is applied onto the transparent conductive films 62a and 62b, thus forming alignment films 63a and 63b, respectively. As the alignment material, a photo-alignable material is used which, when irradiated with linearly-polarized ultraviolet rays and subjected to an exposure, acquires an alignment in the polarization direction.

Figure 11:
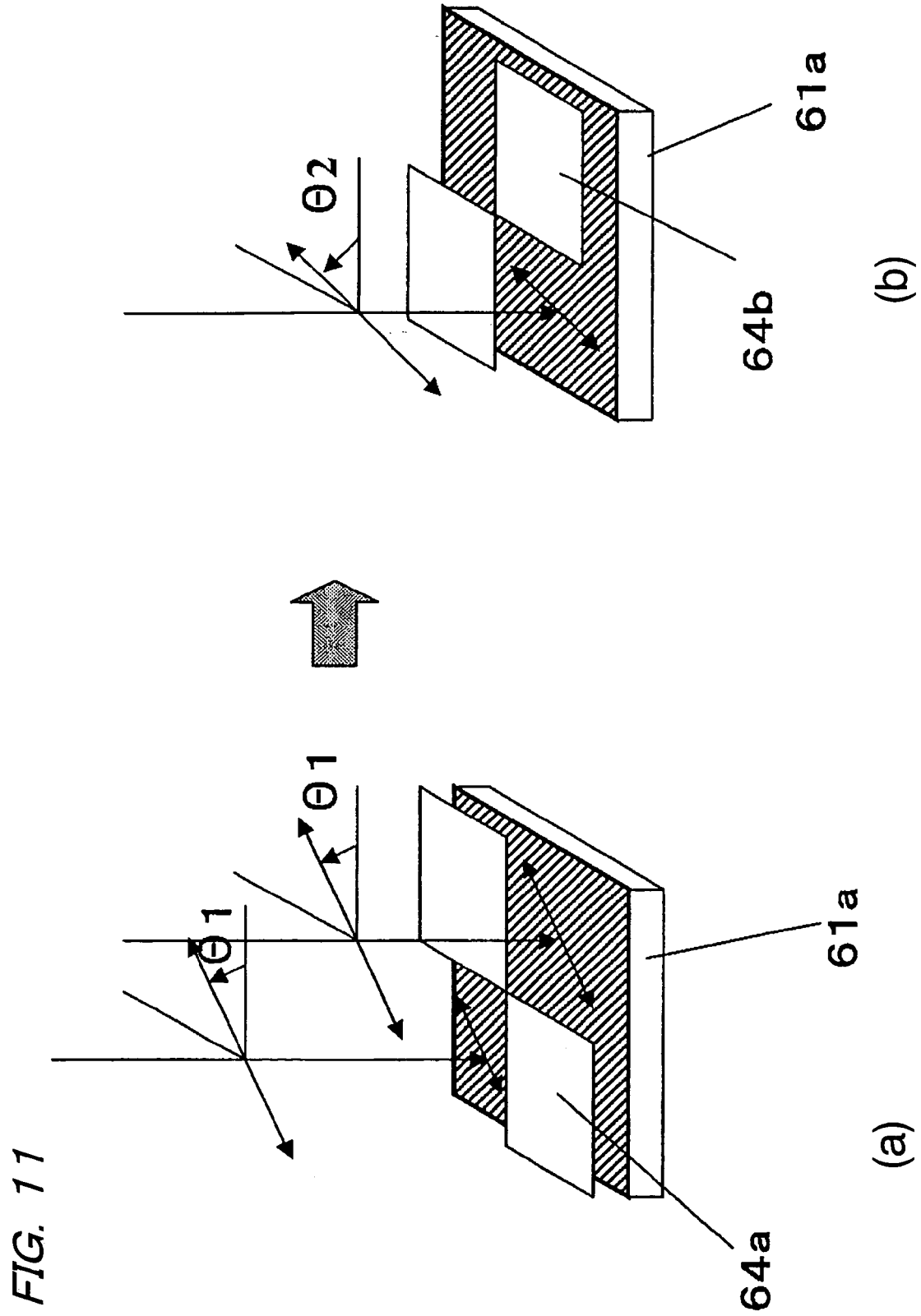
FIG. 11 includes (a) and (b), which are diagrams showing an alignment film treatment in a method for producing a distributed-type wavelength plate according to each embodiment of the present invention.

Next, as shown in FIG. 11, when forming regions having an optic axis in the direction defined by an angle $\theta_1$, the transparent substrate 61a (or 61b) is irradiated with ultraviolet rays while covering the other regions with a mask 64a, the ultraviolet rays being linearly polarized in the direction defined by the angle $\theta_1$. On the other hand, when forming regions having an optic axis in the direction defined by an angle $\theta_2$, the transparent substrate 61a (or 61b) is irradiated with ultraviolet rays while covering the other regions with a mask 64b, the ultraviolet rays being linearly polarized in the direction defined by the angle $\theta_2$.

Figure 12:
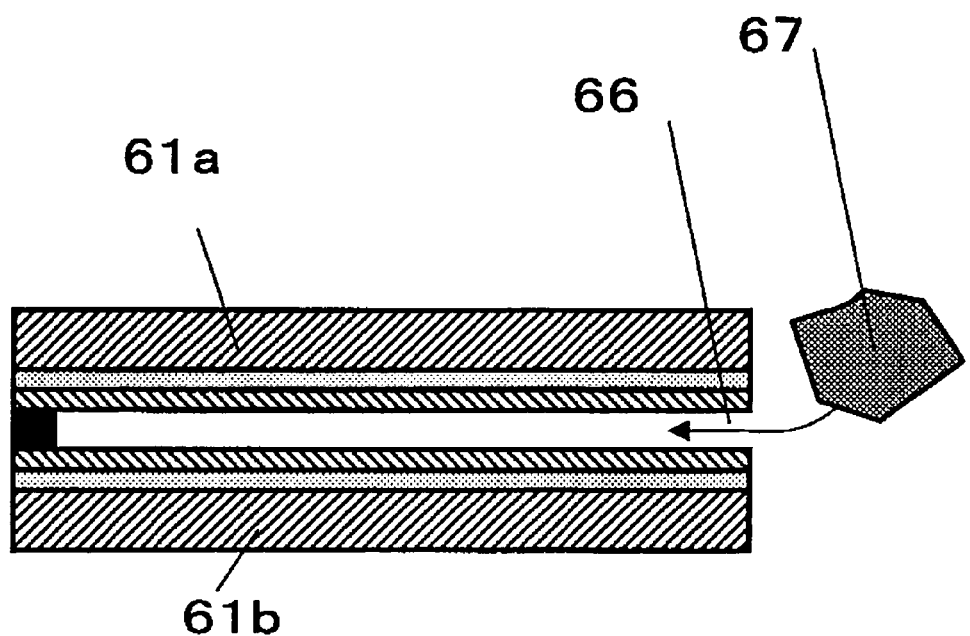
FIG. 12 is a diagram showing a manner in which a liquid crystal material is injected in a method for producing a distributed-type wavelength plate according to each embodiment of the present invention.

Next, as shown in FIG. 12, the transparent substrate 61a and the transparent substrate 61b are placed so as to oppose each other, and after the peripheries are attached by means of an adhesive, a liquid crystal material 67 containing a UV-curing resin is injected into the interior, through an aperture 66. Once the liquid crystal material 67 is injected, the longer axis of each liquid crystal molecule will be aligned in accordance with the alignment directions of the alignment films 63a and 63b.

In order to further enhance the alignment uniformity of the liquid crystal layer 68, it is preferable to apply a voltage between the transparent electrode films 62a and 62b, thus creating an electric field across the liquid crystal layer 68. In the case where no such electric field is to be applied, the transparent electrode films 62a and 62b may be omitted.

Figure 13:
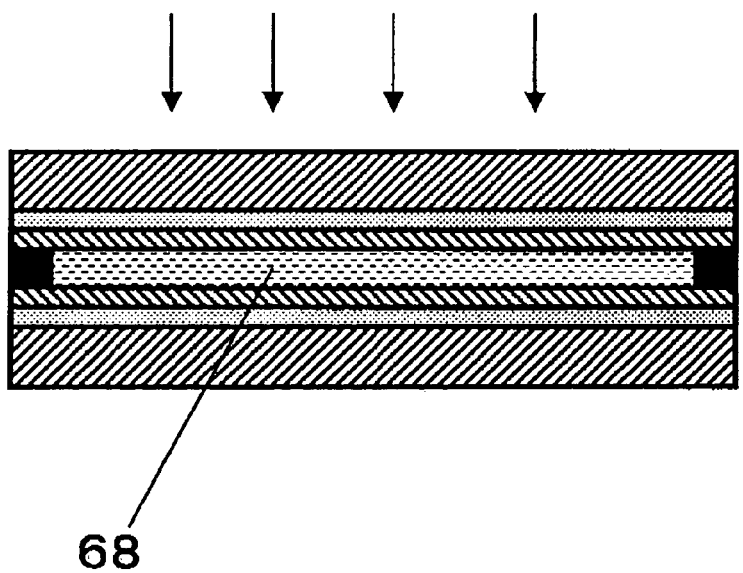
FIG. 13 is a diagram showing a manner of ultraviolet irradiation in a method for producing a distributed-type wavelength plate according to each embodiment of the present invention.

Next, as shown in FIG. 13, the liquid crystal layer 68 is irradiated with unpolarized ultraviolet rays, thus curing the liquid crystal layer 68.

Alignment restriction for a liquid crystal layer is typically performed by rubbing the surface of the alignment film in a predetermined direction, with a cloth on which fine fibers, e.g., polyamide type synthetic fibers, are formed. However, the present embodiment adopts an optical alignment technique in order to obtain different alignment directions within the same plane. By using such an optical alignment technique, it is possible to obtain a desired alignment distribution. Note that at least one of the transparent conductive films 62a and 62b may be patterned in accordance with the division pattern of the regions. By thus patterning the transparent conductive film 62a and/or 62b, it becomes possible to apply different voltages to different regions, thus facilitating a region-by-region control of the alignment state.

A wavelength plate and an optical pickup according to the present invention are applicable as devices for use in an optical information recording apparatus which enables recording/reproduction for a number of different types of optical storage media with a single apparatus, and are especially suitable for applications such as recording-type optical disk apparatus, e.g., CDs, DVDs, and Blu-ray discs, in which an integral light source and an integral photodetector are used so as to support different wavelengths, this being in order to satisfy the requirements of having a small size and low costs.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-283855 filed on Sep. 29, 2004 and No. 2005-278539 filed on Sep. 26, 2005, the entire contents of which are hereby incorporated by reference.

What is claimed is:

1. A wavelength plate to be placed in an optical path through which rays of a plurality of wavelengths travel back and forth, the plurality of wavelengths including a ray having a $\lambda$, the wavelength plate comprising:
   a two-dimensional array of a plurality of birefringent regions, the birefringent regions including first and second regions having different optic axis directions from each other, with the first and second regions being arranged on the same plane to form the two-dimensional array of a plurality of birefringent regions,
   wherein the relationship $240°\leq\Delta_1\leq300°$ is true, where $\Delta_1$ is a retardation of the wavelength plate for the ray of the $\lambda$.

2. The wavelength plate of claim 1, wherein the plurality of birefringent regions are disposed so as to be axisymmetrical with respect to each of two lines intersecting each other on a surface of the wavelength plate, the two lines intersecting at a center axis which is perpendicular to the surface, and rotation symmetrical with respect to the center axis.

3. The wavelength plate of claim 2, wherein the plurality of birefringent regions are disposed so that the first regions and the second regions form a check pattern.

4. The wavelength plate of claim 1, wherein the optic axis direction of the first regions is $45°-\alpha$ (where $0<\alpha\leq15°$) with respect to a polarization direction of the ray of the $\lambda$, and the optic axis direction of the second regions is 45°+α (where 0<α≦15°) with respect to the polarization direction of the ray having the λ.

5. The wavelength plate of claim 1, wherein the optic axis direction of the first regions is 45°+δ−α (where 0<α≦15°) with respect to a polarization direction of the ray of the λ., and the optic axis direction of the second regions is 45°+δ+60 (where 0<α≦15°) with respect to the polarization direction of the ray having the λ.

6. An optical element comprising:
the wavelength plate of claim 1; and
a polarization filter.

7. The optical element of claim 6, wherein the polarization filter is a polarization hologram.

8. An optical pickup comprising:
at least one light source for radiating rays of a plurality of wavelengths, including a ray having a wavelength λ;
converging means for converging a ray radiated from the light source onto an optical information medium;
a photodetector for receiving light reflected from the optical information medium; and
an optical element disposed in a portion commonly shared by an optical path of a ray traveling from the light source toward the optical information medium and an optical path of a ray traveling from the optical information medium toward the photodetector, wherein,
the optical pickup includes a wavelength plate and a polarization filter,
the wavelength plate comprising:
a two-dimensional array of a plurality of birefringent regions, the birefringent regions including first and second regions having different optic axis directions from each other, with the first and second regions being arranged on the same plane to form the two-dimensional array of a plurality of birefringent regions,
wherein the relationship 240°≦$\Delta_1$≦300° is true, where $\Delta_1$ is a retardation of the wavelength plate for the ray of the wavelength λ.

9. The optical pickup of claim 8, wherein the photodetector receives any one of the rays of the plurality of wavelengths reflected from the optical information medium.

10. An optical pickup comprising:
a unit integrating:
at least one light source for radiating rays of a plurality of wavelengths, including a ray having a wavelength λ, and
a photodetector for receiving any one of the rays of the plurality of wavelengths reflected from an optical information medium; and
an optical element disposed in a portion commonly shared by an optical path of a ray traveling from the light source toward the optical information medium and an optical path of a ray traveling from the optical information medium toward the photodetector, wherein,
the optical pickup includes a wavelength plate and a polarization filter,
the wavelength plate comprising:
a two-dimensional array of a plurality of birefringent regions, the birefringent regions including first and second regions having different optic axis directions from each other, with the first and second regions being arranged on the same plane to form the two-dimensional array of a plurality of birefringent regions,
wherein the relationship 240°≦$\Delta_1$≦300° is true, where $\Delta_1$ is a retardation of the wavelength plate for the ray of the wavelength λ.

* * * * *